(12) United States Patent  
Nicole

(10) Patent No.: US 12,185,680 B2  
(45) Date of Patent: Jan. 7, 2025

(54) RED AND FAR-RED LIGHT RATIO DURING GROWTH OF BASIL

(71) Applicant: SIGNIFY HOLDING B.V., Eindhoven (NL)

(72) Inventor: Celine Catherine Sarah Nicole, Eindhoven (NL)

(73) Assignee: SIGNIFY HOLDING B.V., Eindhoven (NL)

(*) Notice: Subject to any disclaimer, the term of this patent is extended or adjusted under 35 U.S.C. 154(b) by 122 days.

(21) Appl. No.: 17/801,679

(22) PCT Filed: Feb. 26, 2021

(86) PCT No.: PCT/EP2021/054796  
§ 371 (c)(1),  
(2) Date: Aug. 23, 2022

(87) PCT Pub. No.: WO2021/170783  
PCT Pub. Date: Sep. 2, 2021

(65) Prior Publication Data  
US 2023/0128621 A1   Apr. 27, 2023

(30) Foreign Application Priority Data  
Feb. 28, 2020 (EP) .................................. 20159978

(51) Int. Cl.  
*A01G 22/15* (2018.01)  
*A01G 7/04* (2006.01)  
*H05B 47/16* (2020.01)

(52) U.S. Cl.  
CPC ............. *A01G 7/045* (2013.01); *A01G 22/15* (2018.02); *H05B 47/16* (2020.01)

(58) Field of Classification Search  
CPC ................................ A01G 7/045; A01G 22/15  
USPC .................................................... 47/58.1 LS  
See application file for complete search history.

(56) References Cited

U.S. PATENT DOCUMENTS

| 9,549,507 B2* | 1/2017 | Takeuchi | A01G 7/045 |
| 2005/0193448 A1 | 9/2005 | Gardner et al. | |
| 2015/0128489 A1* | 5/2015 | Yamada | A01G 7/045 |
| | | | 47/58.1 LS |

(Continued)

FOREIGN PATENT DOCUMENTS

| CN | 108811870 A | 11/2018 |
| CN | 109964683 A * | 7/2019 |

(Continued)

OTHER PUBLICATIONS

Lund, J. Bjerregaard, Stem Elongation of Chrysanthemum in Response to End-of-Day Light Treatments and Photoperiod, 2008, ISHS Acta Horticulturae, No. 766, 109-114 (Year: 2008).*

*Primary Examiner* — Tien Q Dinh  
*Assistant Examiner* — Erica M Huebner

(57) ABSTRACT

A horticulture lighting arrangement comprises (i) a lighting system configured to provide horticulture light having a controllable spectral power distribution, and (ii) a control system configured to control the spectral power distribution of the horticulture light; wherein in an operational mode of the horticulture lighting arrangement the horticulture lighting arrangement is configured to provide the horticulture light according to an on-off schedule wherein consecutively an on-period (D) and an off-period (N) are applied.

14 Claims, 9 Drawing Sheets

(56) References Cited

U.S. PATENT DOCUMENTS

| | | | | |
|---|---|---|---|---|
| 2016/0088802 A1* | 3/2016 | Nicole | .................. | H05B 47/11 |
| | | | | 315/297 |
| 2016/0192598 A1* | 7/2016 | Haggarty | ............... | H05B 47/19 |
| | | | | 315/297 |
| 2017/0135359 A1 | 5/2017 | Nicole et al. | | |
| 2018/0206422 A1* | 7/2018 | Vandecruys | ............. | A01G 7/02 |
| 2019/0230801 A1 | 7/2019 | Neuman et al. | | |

FOREIGN PATENT DOCUMENTS

| | | | | |
|---|---|---|---|---|
| WO | WO-2008064222 A2 * | 5/2008 | ......... | C12N 15/8261 |
| WO | WO-2015151405 A1 * | 10/2015 | ............ | A01G 7/045 |
| WO | WO-2017192566 A1 * | 11/2017 | ............ | A01G 7/045 |
| WO | 2019025301 A1 | 2/2019 | | |
| WO | WO-2019025317 A1 * | 2/2019 | ............. | A01G 7/045 |
| WO | 2019162192 A1 | 8/2019 | | |
| WO | 2019206937 A1 | 10/2019 | | |

* cited by examiner

RED AND FAR-RED LIGHT RATIO DURING GROWTH OF BASIL

CROSS-REFERENCE TO PRIOR APPLICATIONS

This application is the U.S. National Phase application under 35 U.S.C. § 371 of International Application No. PCT/EP2021/054796, filed on Feb. 26, 2021, which claims the benefit of European Patent Application No. 20159978.4, filed on Feb. 28, 2020. These applications are hereby incorporated by reference herein.

FIELD OF THE INVENTION

The invention relates to a horticulture lighting arrangement and to a horticulture system comprising such horticulture lighting arrangement. The invention further relates to a method for providing horticulture light to a plant, especially a Basil plant (with such horticulture lighting arrangement or horticulture system).

BACKGROUND OF THE INVENTION

Industrial plant growing facilities and methods of using such plant growing facilities are known in the art. US2018/0206422, for instance, describes an industrial plant growing facility for growing plants of at least one plant species comprising: a housing enclosing a growth chamber; a plurality of racks positioned in the growth chamber, wherein each rack is configured for receiving one or more trays; a plurality of trays placed in the plurality of racks, the plurality of trays being configured for receiving a plurality of plants of the at least one plant species, and the plurality of trays being configured for receiving a growth medium; a fluidic system configured for providing the trays with a growth medium comprising nutrients and having a pH, wherein the fluidic system is configured for adapting the nutrient concentration and pH according to a predetermined nutrient concentration and predetermined pH for the plant species; a climate system configured for providing a temperature and humidity within the growth chamber, wherein the climate system is configured for adapting the temperature and humidity within the growth chamber according to a predetermined temperature and predetermined humidity for the plant species; a plurality of light-emitting diode (LED)-based lighting devices configured for providing a light spectrum and a light intensity, wherein the light spectrum comprises photosynthetically active radiation (PAR); and wherein the LED-based lighting devices are configured for adapting the light intensity and/or light spectrum according to a predetermined light intensity and/or predetermined light spectrum for the plant species; a carbon dioxide system configured for providing a carbon dioxide concentration within the growth chamber, wherein the carbon dioxide system is configured for adapting the carbon dioxide concentration according to a predetermined carbon dioxide concentration for the plant species; and, a transport system for transporting the trays.

SUMMARY OF THE INVENTION

Plants use the process of photosynthesis to convert light, $CO_2$ and $H_2O$ into carbohydrates (sugars). These sugars are used to fuel metabolic processes and for biomass formation. This biomass formation may include stem elongation, increase of leaf area, flowering, fruit formation, etc. Photosynthesis may involve one or more plant photoreceptors, such as chlorophyll. Photoreceptors may also be involved in other interactions between plants and radiation, such as photoperiodism, phototropism and photomorphogenesis: photoperiodism may refer to the ability of a plant to sense and measure the periodicity of radiation (e.g. to induce flowering); phototropism refers to the growth movement of a plant towards and/or away from radiation; and photomorphogenesis refers to a morphological change in response to the wavelengths and the intensity of radiation.

Two important absorption peaks of chlorophyll a and b may be located in the red and blue regions, especially from 625-675 nm and from 425-475 nm, respectively. Additionally, there may also be other localized peaks at near-UV (300-400 nm) and in the far-red region (700-800 nm). The main photosynthetic activity seems to take place within the wavelength range 400-700 nm. Radiation within this range is called photosynthetically active radiation (PAR).

In the context of horticulture lighting, near-UV is defined as one or more wavelengths selected from the spectral range of 300-400 nm, blue is defined as one or more wavelengths selected from the spectral range of 400-500 nm, white is defined is defined as wavelengths selected from the spectral range of 400-700 nm (which selected wavelengths together may constitute white light, such as a combination of wavelengths in the blue and green and red), green is defined as one or more wavelengths selected from the spectral range of 500-600 nm, red is defined as one or more wavelengths selected from the spectral range of 600-700 nm, deep-red is defined as one or more wavelengths selected from the spectral range of 640-700 nm, and far-red is defined as one or more wavelengths selected from the spectral range of 700-800 nm. Deep-red is thus a subrange of red.

Photo sensitive processes in plants may also relate specifically to phytochromes, a class of receptors. Phytochrome activity may steer different responses such as leaf expansion, neighbor perception, shade avoidance, stem elongation, seed germination and flowering induction. Phytochromes may change their (conformational) state in dependence of one or more (external) signals, such as upon exposure to one or more specific wavelengths of radiation, or upon exposure to temperature changes. For example, plants may comprise a phytochrome having two conformational states Pr and Pfr, which may switch to the other conformational state upon light absorption, and which may have their sensitivity peaks in the red at about 660 nm and in the far-red at about 730 nm, respectively.

In horticulture, light intensity may be measured in photosynthetic photon flux density (PPFD), which refers to the number of photons per second per unit of area (in μmol/sec/$m^2$; a mol corresponding to $6 \cdot 10^{23}$ photons). In practice, when applying e.g. inter-lighting, the red PPFD used may be typically 200 μmol/sec/$m^2$ and the ratio blue:red may be typically 1:7 (with red and blue especially selected from 625-675 nm and especially selected from 400-475 nm, respectively). Especially, the photosynthetic photon flux density may comprise about 10% blue and about 90% red. The PPFD can be determined from a photodiode or measured directly with a photomultiplier. The area in the PPFD refers to the local light receiving (plant) area of the space wherein the light source(s) are arranged. In case of a multi-layer system, it may be defined as the area of a relevant layer comprised in the multi-layer configuration; the PPFD may then be estimated in relation to each layer individually (see further also below). The area may be a value, in an embodiment, fed to the control unit manually or may, in an embodiment, be evaluated (with e.g. sensors) by the control unit.

Plant growth may depend not only on the light intensity but also on parameters such as spectral composition, duration, and timing of the light the plant is exposed to. A combination of two or more parameter values in terms of these parameters is called a "light recipe" for growing the plant (or a crop).

Light emitting diodes (LEDs) can play a variety of roles in horticultural lighting such as: (1) Supplemental lighting: Lighting that supplements the natural daylight in order to increase production (of tomatoes for example) or extend crop production during e.g. the autumn, winter, and spring period when crop prices may be higher; (2) Photoperiodic lighting: The periodic duration of light is important for many plants. The durations and the relative ratio of light and dark periods in a, for example, 24 hour cycle influences the blossoming response of many plants. Manipulating the durations and/or their ratio by means of supplemental lighting may facilitate regulating the time of blossoming; (3) Artificial lighting: Lighting for cultivation in horticulture systems independent of natural sunlight; (4) Differentiation lighting: Lighting selected to facilitate cell differentiation, for example in the context of a tissue culture.

In circumstances that plants get insufficient light from natural sunlight, e.g. in northern regions or in so-called "plant farming" or "vertical farming" that fully rely on artificial and well-controlled conditions, there appears to be a need to provide light to the plant for growing (leaf and fruit), ripening and pre-harvest conditioning.

The space available for food production may be becoming scarcer. Hence innovation in production methods may be needed to deliver higher yields from smaller footprints, while becoming more sustainable (minimum use of energy and water). Producing food in closed environments such as plant farms is a method to meet these demands. In plant farms (also known as plant factories, vertical farms or city farms), food may be grown in multiple layers, making much better use of the available space as compared to outdoor growth or growth in greenhouses. This implies that in plant farms natural sunlight will not be able to reach all plants and a substantial proportion of the light may need to come from artificial lighting. In plant farms, there is a desire for providing a light treatment (to the plants) that is optimal at all times. At the same time, it is desirable that the light that is generated by the light sources is used as efficiently as possible in order to reduce energy consumption. In plant farms, the production per unit of area may be much higher than the production in the open field. The use of water is minimized. Plant diseases and pests can be prevented more easily.

The term "horticulture" relates to (intensive) plant cultivation for human use and is very diverse in its activities, incorporating plants for food (fruits, vegetables, mushrooms, culinary herbs) and non-food crops (flowers, trees and shrubs, turf-grass, hops, grapes, medicinal herbs). Horticulture is the branch of agriculture that deals with the art, science, technology, and business of growing plants. It may include the cultivation of medicinal plants, fruits, vegetables, nuts, seeds, herbs, sprouts, mushrooms, algae, flowers, seaweeds and non-food crops such as grass and ornamental trees and plants. Here, the term "plant" is used to refer essentially to any species selected from medicinal plants, vegetables, herbs, sprouts, mushrooms, plants bearing nuts, plants bearing seeds, plants bearing flowers, plants bearing fruits, non-food crops such as grass and ornamental trees, etc.

Herein, the term "plant" is used for essentially all stages of plant development. The term "plant part" may refer to root, stem, leaf, fruit (if any), flowers (if any) etc.

The term "crop" may herein be used to refer to a plant species or variety that is grown to be harvested as e.g. food, livestock fodder, fuel, or for any other economic purpose. The term "crop" may also relate to a plurality of crops. The term "plant" may also refer to a seed, or to a seedling. The term "plant" may thus in general refer to any of the stages from seed to (mature) plant. The term "plant" may also refer to a plurality of (different) plants.

The term "horticulture light" may herein especially refer to light having one or more wavelengths in one or more of a first wavelength region of 400-475 nm and a second wavelength region of 625-675 nm. The relative energies (watt) that are provided in these wavelength regions may depend on circumstances and may for example depend upon the type of plant and/or the growth phase. Hence, a recipe may define the ratio of different wavelengths of light in the horticulture light, optionally as function of time, for one or more types of plants. Especially, the term "horticulture light" may refer to the PAR wavelength region (the photosynthetically active region from 400-700 nm). The term "horticulture light" may also be used for light that is applied to plants in hydroponic applications.

The above may—amongst others—apply to (artificial) horticulture light in general. In the present invention, amongst others, further specific horticulture light recipes are proposed. Also, in the present invention, amongst others, further specific horticulture lighting arrangements are proposed. The light recipe may in embodiments especially include an on-time, wherein horticulture light is provided, which may also be indicated as "day" or "light period", and an off-time, wherein essentially no horticulture light is provided, which may also be indicated as "night" or "dark period".

*Basilicum* (*Ocimum basilicum*) or "Basil" is a tropical plant used as culinary herb. Among herbs, it is one of the most expensive and most widespread sold herbs. It is also a plant that is very sensitive to temperatures lower than 10° C. Advice is to store it to 12° C. Storage at a lower temperature appears to induce a rapid decay of the leaves showing a blackening of the leaf surface starting with small dots. The product becomes very quickly unsalable which may imply a huge waist for supermarkets and consumers. To increase the so-called "chilling resistance" of Basil, the only reliable solution seems to never store the Basil at a temperature lower than 12° C. Cold acclimation may be applied. However, it was observed that it was not always successful for all Basil species. Storing Basil at higher temperatures, such as 18° C. (in a supermarket) would decay the Basil through water losses and wilting as fast as if it would have been stored under chilling conditions. In either case, there is no preferred cold or warm temperature except the ideal about 12° C. However, in general coolers are not designed per crop and usually only a single temperature fridge is used for all the herbs. Other products, however, are generally transported and/or stored at other temperatures than preferred for Basil. Hence, unfortunately, this plant appears to require independent transport and processing from other herbs, making it difficult and expensive. A solution to avoid the chilling effect on Basil would improve production chain a lot.

Hence, it is an aspect of the invention to provide an alternative horticulture system and/or arrangement and/or method, which preferably further at least partly obviate(s) one or more of above-described drawbacks. The present invention may have as object to overcome or ameliorate at least one of the disadvantages of the prior art, or to provide a useful alternative.

Hence, in a first aspect, the invention provides a horticulture lighting arrangement, comprising (i) a lighting system configured to provide horticulture light (to a Basil plant or "Basil cultivar") having a controllable spectral power distribution, and (ii) a control system configured to control the spectral power distribution of the horticulture light. In specific embodiments, in an operational mode of the horticulture lighting arrangement the horticulture lighting arrangement is configured to provide the horticulture light according to an on-off schedule wherein consecutively an on-period (D) and an off-period (N) are applied. Especially, in embodiments the horticulture light comprises one or more of first horticulture light comprising a wavelength selected from the range of 400-600 nm, red light comprising a wavelength selected from the range of 600-700 nm, and far-red light comprising a wavelength selected from the range of 700-800 nm. Further, in embodiments the on-period may last in in the range of 12-20 hours and the off-period lasts in the range of 4-12 hours. Further, especially the on-period comprises an end-of-day period (EOD) at the end of the on-period. In embodiments, the end-of-day period lasts in the range of at least about 0.25 hours, such as selected from the range of about 0.5-4 hours. Further, especially in embodiments during at least part of the on-period before the end-of-day period a R/Fr ratio, defined as a ratio $I_{600\text{-}700\ nm}/I_{700\text{-}800\ nm}$ of red light and far-red light, is selected from the range of 4-20. Further, especially in embodiments during at least part of the end-of-day period the R/Fr ratio is selected from the range of 0.1-4. In embodiment, the R/Fr ratio during the at least part of the on-period (D) is larger than the R/Fr ratio during the at least part of the end-of-day period (EOD). Hence, especially the invention provides in embodiments a horticulture lighting arrangement, comprising (i) a lighting system configured to provide horticulture light having a controllable spectral power distribution, and (ii) a control system configured to control the spectral power distribution of the horticulture light; wherein in an operational mode of the horticulture lighting arrangement the horticulture lighting arrangement is configured to provide the horticulture light according to an on-off schedule wherein consecutively an on-period and an off-period are applied, wherein: (i) the horticulture light comprises one or more of first horticulture light comprising a wavelength selected from the range of 400-600 nm, red light comprising a wavelength selected from the range of 600-700 nm, and far-red light comprising a wavelength selected from the range of 700-800 nm; (ii) the on-period lasts in in the range of 12-20 hours and the off-period lasts in the range of 4-12 hours, wherein the on-period comprises an end-of-day period at the end of the on-period, wherein the end-of-day period lasts in the range of at least about 0.25 hours, especially selected from the range of 0.5-4 hours; and (iii) wherein during at least part of the on-period before the end-of-day period a R/Fr ratio, defined as a ratio $I_{600\text{-}700\ nm}/I_{700\text{-}800\ nm}$ of red light and far-red light, is selected from the range of 4-20, and during at least part of the end-of-day period the R/Fr ratio is selected from the range of 0.1-4.

In the definition of the R/Fr ratio, the term "$I_{600\text{-}700\ nm}$" refers to the light intensity of the red light component in the horticulture light in terms of μmol/m²/s of photons in the wavelength range selected from the range of 600-700 nm and the term "$I_{700\text{-}800\ nm}$" refers to the light intensity of the far-red light component in the horticulture light in terms of μmol/m²/s of photons in the wavelength range selected from the range of 700-800 nm. It is to be noted that the R/Fr ratio of horticulture light is a property of the light generated by and emitted from a lighting system, lighting device or lighting apparatus onto the plants.

In order to create the claimed chilling resistance effect, the expressions "at least part of the on-period" and "at least part of the end-of-day period", should be interpreted as a substantial part of said period, meaning at least 50%, preferably at least 80%, more preferably at least 90% of said period. In embodiments the above expressions refer to essentially the entire duration of said period, i.e. essentially the entire on-period or essentially the entire end-of-day period.

With such arrangement and/or with the herein described method (see also further below), it appears that chilling resistance can be improved. Several experiments wherein the length of the time wherein a substantial dose of far-red light was applied was varied, showed that the end-of-day option may have a good effect on chilling resistance and may be a relatively energy friendly solution. The inventors found that there is a preferred range for the end-of-day time period during which a substantial dose of far-red light is applied. On the one hand, increasing the time period wherein a substantial dose of far-red light is applied may essentially not further improve the chilling resistance, but leads to more energy consuming solutions. On the other hand, substantially reducing the time period wherein a substantial dose of far-red light is applied may have a smaller or no effect on the chilling resistance. The term "chilling resistance" especially refers to the chilling resistance of the harvested Basil plant, especially its leaves.

As indicated above, the invention provides amongst others a horticulture lighting arrangement. Such horticulture lighting arrangement at least comprises a lighting system. The lighting system may comprise one or more light sources, especially a plurality of light sources. Further, the light generated by the lighting system may be controllable in one or more of spectral power distribution and spectral power, especially at least in the spectral power distribution. The lighting system is configured to provide in one or more operational modes light that can be used by plants to grow, bolt, mature, etc. Hence, the light is herein also indicated as "horticulture light" (see also below).

Especially, the horticulture light may comprise one or more of (a) first horticulture light comprising a wavelength selected from the range of 400-600 nm, (b) red light comprising a wavelength selected from the range of 600-700 nm, and (c) far-red light comprising a wavelength selected from the range of 700-800 nm. First horticulture light and red light may in embodiments together provide PAR light.

Hence, the horticulture lighting arrangement especially comprises a lighting system configured to provide horticulture light, having a controllable spectral power distribution.

The horticulture light is especially provided to a Basil plant. This Basil plant may comprise a Basil cultivar. The term "Basil plant" may also refer to a plurality of Basil plants.

Especially, such horticulture lighting arrangement may also comprise a control system. Such control system may especially be configured to control the spectral power distribution of the horticulture light. Amongst others, this may allow control of the spectral power distribution over time. As indicated above, a specific light recipe appears to be beneficial for achieving an improved chilling resistance (of the Basil plant). The control system may be comprised by the lighting system or may be configured external to the lighting system. Especially, the control system is functionally coupled to the lighting system. The invention also provides the lighting system per se and/or the control system per se.

In embodiments, in an operational mode of the horticulture lighting arrangement the horticulture lighting arrangement is configured to provide the horticulture light according to an on-off schedule wherein consecutively an on-period and an off-period are applied. Hence, the light recipe may include a series of on-periods and off-periods which are executed consecutively. In this way, a day-night rhythm may be mimicked. A set of an on-period and an off-period together may last 24 hours, but may also last shorter or longer. Especially, the shortest cycle maybe 16 hours and the longest cycle may be 32 hours. In general, the cycles may be about 24 hours. The 24 hours cycles may align with the diurnal cycle experienced by plants in a greenhouse. Especially in plant farms where plants are grown in a closed (daylight-free) environment using substantially only artificial light, the cycle may deviate from the diurnal cycle. Further, in general, the duration of the cycles are essentially the same across the growth of the plant. Hence, in embodiments the control system may be configured to control the lighting system such that the lighting system provides the horticulture light according to an on-off schedule wherein consecutively an on-period and an off-period are applied.

In specific embodiments, the on-period may last in in the range of 12-20 hours and the off-period may last in the range of 4-12 hours. Especially, in embodiments the on-period lasts in in the range of 14-19 hours and the off-period lasts in the range of 5-10 hours. This may provide a good yield of the Basil plants in a reasonable time.

In general, the spectral power distribution during the on-period may be essentially the same over the entire on-period. In the present invention, however, at the end of the on-period, there may be a substantial contribution or increase in contribution in the far-red. Hence, at the end of the on-period, there may be an end-of-day period, wherein the spectral power distribution of the horticulture light is different from the spectral power distribution of the horticulture light during the preceding part of the on-period.

Further, this end-of-day period may last in the order of about 0.5-4 hours of the on-period which in total may last in in the range of 12-20 hours. Hence, the day period preceeding the end-of-day period may last in the order of 8-19.5 hours. Especially, however the preceding day period may in embodiments especially last at least about 10 hours, even more especially at least about 12 hours. Hence, in embodiments the on-period comprises an end-of-day period at the end of the on-period, wherein the end-of-day period lasts in the range of 0.5-4 hours, such as at least 1 hour. Subsequent to the end of the end-of-day period, the off-period may start. Hence, especially the on-period terminates with the termination of the end-of-day period. In other words, the off-period may start upon termination of the end-of-day period.

As indicated above, during the end-of-day period the contribution of the far-red may be substantially higher than during the preceding part of the on-period. This appears to substantially increase the chilling resistance. During the on-period preceding the end-of-day period there may be some far-red, though this is not necessarily the case. Especially, however, there is during essentially the entire on-period some far-red horticulture light, but with a (substantially) increased contribution during the end-of-day period. Further, in general during essentially the entire on-period some red horticulture light is comprised by the horticulture light, though this is not necessarily the case. In many embodiments herein, however, during the entire on-period there is red and far-red horticulture light. The increased chilling resistance is especially obtained with a relatively low far-red contribution during the part of the on-period preceding the end-of-day period, and with a relatively high far-red contribution during the end-of-day part of the on-period. In specific embodiments, during at least part of the on-period before the end-of-day period a R/Fr ratio, defined as a ratio $I_{600-700\ nm}/I_{700-800\ nm}$ of red light and far-red light, is selected from the range of 4-20, and during at least part of the end-of-day period the R/Fr ratio is selected from the range of 0.1-4. Especially, in specific embodiments, during (essentially) the entire part of the on-period before the end-of-day period a R/Fr ratio, defined as a ratio $I_{600-700\ nm}/I_{700-800\ nm}$ of red light and far-red light, is selected from the range of 4-20, and during (essentially) the entire part of the end-of-day period the R/Fr ratio is selected from the range of 0.1-4. Especially, the R/Fr ratio in the end-of-day period is at least 10%, such as at least 20%, smaller than the R/Fr ratio during the part of the on-period preceding the end-of-day period.

Hence, in embodiments during 8-19.5 hours in the on-period horticulture light may be provided with a ratio $I_{600-700\ nm}/I_{700-800\ nm}$ of red light and far-red light selected from the range of 4-20, and during 0.5-4 hours at the end-of-day part of the on-period horticulture light may be provided with a ratio $I_{600-700\ nm}/I_{700-800\ nm}$ of red light and far-red light selected from the range of 0.1-4.

Especially, in embodiments the end-of-day period lasts in the range of at least 1 hour. Shorter periods, especially shorter than about 0.5 h, may have a too low effect on the chilling resistance. Best results in terms of chilling resistance and energy efficiency may be obtained when the end-of-day period lasts in the range of at least 1-3.5 hours, especially 1-3 hours, such as at least about 1.5 hours.

Hence, in embodiments during an end-of-day period (EOD) at the end of the on-period a relative contribution of far-red light having a wavelength selected from the range of 700-800 nm to the horticulture light is larger than a relative contribution of the far-red light during the on-period before the end-of-day period (EOD).

During the (entire) on-period the horticulture light may comprise one or more of first horticulture light (comprising a wavelength selected from the range of 400-600 nm), red light (comprising a wavelength selected from the range of 600-700 nm), and far-red light (comprising a wavelength selected from the range of 700-800 nm). In embodiments, during the end-of-day period the horticulture light may essentially consist of the far-red light. In alternative embodiments, during the end-of-day period the horticulture light may not only consist of the far-red light, but also comprise one or more of first horticulture light and red light, especially at least red light, even more especially first horticulture light and red light. For instance, in embodiments a first set of one or more light sources is configured to provide first horticulture light and red light (and optionally some far-red light) and a second set of one or more light sources is configured to provide far-red light (and optionally some red light). Hence, in specific embodiments during part of the end-of-day period first horticulture light, red light, and far-red light are provided.

In specific embodiments, the horticulture light during at least part of the on-period before the end-of-day period comprises 5-20% of the photons in wavelength range of 400-500 nm, 0-30% of the photons in wavelength range of 500-600 nm, 50-95% of the photons in wavelength range of 600-700 nm, and 0-6% of the photons in wavelength range of 700-800 nm, with the various contributions of photons in total not exceeding 100%. Alternatively or additionally, in embodiments the horticulture light during at least part of the end-of-day period comprises 0-10% of the photons in wavelength range of 400-500 nm, 0-15% of the photons in wavelength range of 500-600 nm, 0-80% of the photons in wavelength range of 600-700 nm, and 20-100% of the photons in wavelength range of 700-800 nm, with the various contributions of photons in total not exceeding 100%.

Hence, in embodiments during 8-19.5 hours in the on-period horticulture light may be provided comprising 5-20% of the photons in wavelength range of 400-500 nm, 0-30% of the photons in wavelength range of 500-600 nm, 50-95% of the photons in wavelength range of 600-700 nm, and 0-6% of the photons in wavelength range of 700-800 nm, with the various contributions of photons in total not exceeding 100%, and during 0.5-4 hours at the end of the on-period horticulture light may be provided comprising 0-10% of the photons in wavelength range of 400-500 nm, 0-15% of the photons in wavelength range of 500-600 nm, 0-80% of the photons in wavelength range of 600-700 nm, and 20-100% of the photons in wavelength range of 700-800 nm, with the various contributions of photons in total not exceeding 100%.

Hence, the invention also especially provides (in an aspect) a horticulture lighting arrangement, comprising (i) a lighting system configured to provide horticulture light (to a Basil plant) having a controllable spectral power distribution, and (ii) a control system configured to control the spectral power distribution of the horticulture light; wherein in an operational mode of the horticulture lighting arrangement the horticulture lighting arrangement is configured to provide the horticulture light according to an on-off schedule wherein consecutively an on-period and an off-period are applied, wherein: (i) the horticulture light comprises one or more of first horticulture light comprising a wavelength selected from the range of 400-600 nm, red light comprising a wavelength selected from the range of 600-700 nm, and far-red light comprising a wavelength selected from the range of 700-800 nm; (ii) the on-period lasts in in the range of 12-20 hours and the off-period lasts in the range of 4-12 hours, wherein the on-period comprises an end-of-day period at the end of the on-period, wherein the end-of-day period lasts in the range of 0.5-4 hours; (iii) wherein (a) the horticulture light during at least part of the on-period before the end-of-day period comprises 5-20% of the photons in wavelength range of 400-500 nm, 0-30% of the photons in wavelength range of 500-600 nm, 50-95% of the photons in wavelength range of 600-700 nm, and 0-6% of the photons in wavelength range of 700-800 nm, with the aggregate contribution of photons from different wavelength ranges not exceeding 100%, and (b) the horticulture light during at least part of the end-of-day period comprises 0-10% of the photons in wavelength range of 400-500 nm, 0-15% of the photons in wavelength range of 500-600 nm, 0-80% of the photons in wavelength range of 600-700 nm, and 20-100% of the photons in wavelength range of 700-800 nm, with the aggregate contribution of photons from different wavelength ranges not exceeding 100%. In specific embodiments, the horticulture lighting arrangement is configured to provide during the on-period the horticulture light with an average intensity selected from the range of at least 50 µmol/m$^2$/s at a distance from the lighting system of at least 30 cm (and in specific embodiments at maximum 100 cm). In yet further specific embodiments, the horticulture lighting arrangement is configured to provide during the on-period the horticulture light with an average intensity selected from the range of 100-600 µmol/m$^2$/s at a distance from the lighting system of at least 30 cm (and in specific embodiments at maximum 100 cm). The distance of 30 cm typically is a minimum distance between a lighting apparatus that generates the horticulture light and e.g. a substrate wherein the plant is grown. The distance is especially measured relative to a light emitting surface or exit window of such lighting apparatus from which the horticulture light may emanate. In specific embodiments, this may e.g. be a lens of a light emitting diode or a light transmissive cover of a lighting device housing.

Best results, in terms of yield and energy efficiency, may be obtained in embodiments wherein the horticulture lighting arrangement is configured to provide the horticulture light during the on-period with an average intensity selected from the range 150-450 µmol/m$^2$/s at a distance from the lighting system of at least 30 cm (and in specific embodiments at maximum 100 cm).

During the off-period, there may substantially be no horticulture light, such as equal to or less than about 10 µmol/m$^2$/s at a distance from the lighting system of at least 30 cm, even more especially equal to or less than about 5 µmol/m$^2$/s at a distance from the lighting system of at least 30 cm (and in specific embodiments at maximum 100 cm). Especially, during the off-period, light having a wavelength selected from the range of 400-800 nm has an average intensity at substrate level on or in which the plant is grown of equal to or less than about 5 µmol/m$^2$/s, such as equal to or less than about 5 µmol/m$^2$/s.

In embodiments, the spectral power distribution of the horticulture light during the on-period before the end-of-day period is essentially constant. In further embodiments, the spectral power of the horticulture light during the on-period before the end-of-day period is essentially constant. In embodiments, the spectral power distribution of the horticulture light during the end-of-day period is essentially constant. In further embodiments, the spectral power of the horticulture light during the end-of-day period is essentially constant.

When irradiating the plant(s) with red light and far-red light, it appears that in general the propagation length of the far-red light through the plant(s) canopy is larger than for the red light. This may be due to the fact that leaves may better absorb red light than far-red light. This implies that with plant growth and increasing canopy size over time, for the lower leaves of the plant, the R/Fr ratio, even at identical irradiation conditions, may decrease. Hence, to obtain on average the same R/Fr ratio for the whole of the plant, the R/Fr ratio may be set lower in the earlier phase in the growth period but larger in a later phase in the growth period when the canopy may be more dense. Hence, in embodiments in the operational mode the contribution of far-red light to the horticulture light during the end-of-day period may be controlled as function of one or more of (i) a growth time, growth phase or age of one or more (Basil) plants, and (ii) a canopy density (of one or more (Basil) plants). Alternatively or additionally, in embodiments in the operational mode the spectral power of the horticulture light during the end-of-day period may be controlled as function of one or more of (i) a growth time, growth phase or age of one or more (Basil) plants, and (ii) a canopy density (of one or more (Basil) plants).

The one or more plants may define a canopy density. Different methods may be used to define a canopy density, such as bare soil index, canopy shadow index, etc. However, also optical sensors may be used to sense a canopy density, like reflection or transmission of light, etc. Especially, these embodiments may be related to irradiation from above the plant(s).

In yet other embodiments, light sources that are configured to generate horticulture light may not only provided above the plant(s), but may also be provided at lower positions, such as within the (future) canopy. Alternatively or additionally, light sources may also be configured to generate horticulture light from below the plant(s), such as at about the level of a top of the substrate. Also in such embodiments, the R/Fr ratio and/or the spectral power may be made dependent upon the height of the respective light sources. Hence, in embodiments the lighting system comprises a first light generating device configured to generate at least part of the far-red light, wherein the first light generating device comprises a light emitting surface (from which during operation far-red light emanates), and wherein in the operational mode the contribution of far-red light to the horticulture light during the end-of-day period is controlled as function of a first height (h1) of the light emitting surface of a horticulture light generating device above a substrate for the (Basil) plant. Alternatively or additionally, in the operational mode the spectral power of the horticulture light of a horticulture light generating device during the end-of-day period is controlled as function of a first height (h1) of the light emitting surface above a substrate for the (Basil) plant.

In specific embodiments, the horticulture lighting arrangement comprises a first light generating device configured to generate first device light comprising far-red light, and a second light generating device configured to generate second device light comprising one or more of first horticulture light and red light. The term "first light generating device" may also refer to a plurality of (different) first light generating devices. Alternatively or additionally, the term "second light generating device" may also refer to a plurality of (different) second light generating devices.

In embodiments, the spectral power of the far-red light in the second device light is lower, like at least 5 times lower, especially at least 10 times lower, than the spectral power of the far-red light in the first device light.

In embodiments, at least 70%, even more especially at least 80% of the spectral power in the wavelength range of 400-800 nm is in the 700-800 nm wavelength range for the first device light, and at least 70%, even more especially at least 80% of the spectral power in the wavelength range of 400-800 nm is in the 400-700 nm wavelength range for the second device light.

Hence, the first device light may in embodiments essentially consist of far-red light and the second device light may only comprise a relatively small contribution of far-red light (or essentially no contribution).

Alternatively or additionally, in embodiments the contribution of the far-red light to the first device light is higher, like at least 5 times higher, such as especially at least 10 times higher, than the contribution of the far-red light to the second device light. Herein, the term "contribution" may especially refer to the number of photons (in the relevant spectral range). Further, especially in embodiments during the on-period (D) before the end-of-day period (EOD) a contribution of the first device light to the horticulture light comprising the first device light and the second device light is less than 10%, and during at least part of the end-of-day period (EOD) a contribution of the first device light to the horticulture light comprising the first device light and the second device light is at least 20%.

In embodiments, each day-night cycle may include the herein described end-of-day irradiation. However, it also appears that good results can be obtained when only during part of the growth period of the (Basil) plant such EOD irradiation is applied. Hence, for instance during the first weeks, the on-period is without a specific EOD irradiation at the end of the on-period. The horticulture light may thus be as described herein in relation to the horticulture light in the period preceding the end-of-day period. However, in the last few weeks of growth period of the (Basil) plant the herein described EOD irradiation is applied. Hence, in specific embodiments the horticulture lighting arrangement is configured (in the operational mode) to: (i) apply during a first part of the growing period t during the entire on-periods horticulture light have a R/Fr ratio of at least 4, and (ii) apply during a second part of the growing period t during at least part of the end-of-day periods (EOD) the horticulture light having the R/Fr ratio selected from the range of 0.1-4. This may be useful in a method for growing the Basil plant over a growing period t of at least three weeks. With such operational mode, the desired chilling resistance may be achieved, while energy consumption may further be reduced.

Disclosed herein is also a horticulture system comprising a horticulture lighting arrangement as described above. The term "horticulture system" may herein especially refer to a plant farm, a plant factory, a vertical farm, a city farm and/or a climate cell. In embodiments, the horticulture system may comprise a climate cell.

In embodiments, the horticulture system and/or horticulture lighting arrangement may comprise a lighting apparatus, especially wherein the lighting apparatus comprises a light source for providing horticulture light. In further embodiments, the lighting apparatus may comprise a device, with a device housing, wherein the light source is arranged (at least partially) in the housing. The term "lighting apparatus" may also refer to a plurality of (different) lighting apparatus.

The term "light source" may herein refer to a semiconductor light-emitting device, such as a light emitting diode (LED), a resonant cavity light emitting diode (RCLED), a vertical cavity laser diode (VCSELs), an edge emitting laser, etc. The term "light source" may also refer to an organic light-emitting diode, such as a passive-matrix (PMOLED) or an active-matrix (AMOLED). In embodiments, the light source may comprise a solid state light source (such as a LED or laser diode), especially a LED. The term "LED" may also refer to a plurality of LEDs. Further, the term "light source" may in embodiments also refer to a so-called chips-on-board (COB) light source. The term "COB" especially refers to LED chips in the form of a semiconductor chip that is neither encased nor connected but directly mounted onto a substrate, such as onto a PCB. Hence, a plurality of semiconductor light sources may be configured on the same substrate. In embodiments, the light source may be a COB, wherein the COB is a multi LED chip configured together as a single lighting module. The term "light source" may also relate to a plurality of light sources, such as 2-2000 (solid state) light sources.

In embodiments, a light source configured to provide light having a wavelength selected from a subrange of 400-800 nm, is especially a light source of which at least 50%, such as especially at least 70%, like at least 80%, such as even at least 90% of the power in the spectral range of 400-800 nm is in the subrange. In embodiments, the light source is a light source that is configured to generate light source light having a peak wavelength in the indicated subrange, i.e. the maximum peak in the 400-800 nm range is in the subrange.

Blue light may especially be provided with a blue light source, such as especially a blue LED, though optionally a UV light source, such as especially a UV LED with blue luminescent material may be chosen. Hence, in embodiments, the light source may comprise a blue light source.

Green light may especially be provided with a green light source, especially a green LED, though also a blue light source, especially a blue LED, or a UV light source, especially a UV LED, with green luminescent material may be chosen. Hence, in embodiments, the light source may comprise a green light source.

Red light may especially be provided with a red light source, especially a red LED, though optionally a UV light source, especially UV LED, or a blue light source, especially a blue LED, with red luminescent material may be chosen. Likewise, this may apply to far-red and deep-red. Hence, in embodiments, the light source may comprise a red light source.

White light may especially be provided with a white light source, especially a white LED though optionally a UV light source, especially UV LED, or a blue light source, especially a blue LED, with suitable luminescent material may be chosen. A light source configured to generate white light is especially a light source of which the light that is emitted is white light, as known to the person skilled in the art. It especially relates to light having a correlated color temperature (CCT) between about 2000 and 20000 K, especially 2700-20000 K, and especially within about 15 SDCM (standard deviation of color matching) from the BBL (black body locus), especially within about 10 SDCM from the BBL, even more especially within about 5 SDCM from the BBL.

Especially, the different types of light provided herein are provided with light sources having a peak wavelength in the above indicated wavelength ranges corresponding to the different types of light.

In embodiments wherein the lighting apparatus comprises a plurality of light sources, two or more subsets of the plurality of light sources may be independently controllable in terms of light intensity. Yet further, two or more of the subsets may provide light with different spectral distributions. In such embodiments, intensity and spectral distribution of the horticulture light may be controllable. Hence, the two or more subsets may, in embodiments, be configured to provide light with different spectral distributions.

Further, in specific embodiments, the lighting apparatus may be configured to provide the horticulture light with an average intensity selected from the range of at least 50 µmol/m$^2$/s, such as especially at least 100 µmol/m$^2$/s at a distance from the lighting apparatus of at least 30 cm, such as at least 100 cm. Especially, the lighting apparatus may be configured to provide the horticulture light with the average intensity at a distance of at least 30 cm from the lighting apparatus. Further, the lighting apparatus may be configured to provide the horticulture light with the average intensity during a predefined time period (e.g., hours per day).

In embodiments, the horticulture system may comprise (at least part of) a horticulture lighting arrangement. The horticulture system may especially be configured for hosting a plant. Especially, the horticulture system may comprise a support to support the plant. Hence, in embodiments, during operation the plant may be arranged in a horticulture system. Especially, the term "horticulture system" may refer to structure for hosting the plant, especially wherein the plant is grown under controlled conditions, more especially wherein the plant essentially does not receive natural sunlight. Further, the horticulture system may be climatized, such as in the case of a climate cell.

In further embodiments, a climate cell may comprise the plant support and the lighting apparatus, and the control system may be configured inside or external from the climate cell.

The horticulture system may be configured for growing food in multiple layers, thereby making much better use of the available space as compared to open field growth or growth in greenhouses. This implies that natural sunlight will not be able to reach all plants in the horticulture system and a substantial proportion of the light may need to come from artificial lighting. Hence, the invention especially refers to horticulture systems wherein the plants substantially, especially essentially only, receive artificial light.

In use, the horticulture system may include a plant support with a plant, or a plant support with a seed, or a plant support with a seedling, etc. Hence, in use the horticulture system may include a plant support with a plant, or a plant support with a seed, or a plant support with a seedling, etc. The terms "support" or "plant support" may refer to one or more of (particulate) substrate, aqueous substrate (in hydroponics), soil, wire (for wire crops), etc., which can be used to grow plants in, on, or along, etc.

In embodiments, the horticulture system and/or horticulture lighting arrangement may comprise a sensor.

In further embodiments, the sensor may be configured to sense a parameter, especially a plant-related parameter selected from the group comprising a nutrient, a leaf size, a plant temperature, a plant leaf temperature, a plant root temperature, a plant stem length, a plant fruit size, etc., or especially an environmental parameter selected from the group comprising a temperature, a humidity, a gas composition (in the horticulture system, especially in the horticulture system), and a natural sunlight intensity (in case also natural sunlight would be applied). In further embodiments, the sensor may comprise a camera, such as a CCD camera. The term "sensor" may also refer to a plurality of sensors. Especially the horticulture system, especially the horticulture system, may include a plurality of (spatially separated) (light) sensors.

In further embodiments, the sensor may be configured for sensing one or more of: (i) number and/or appearance and/or color of leaves of the plant, (ii) area and/or color of a canopy of the plant, and (iii) number and/or appearance of flowers of the plant.

In embodiments, the sensor may be configured to monitor a plant-related parameter, and to provide a related sensor signal (to the control system), especially wherein the control system is configured to control the horticulture system in dependence of the sensor signal. In particular, the control system may control the spectral distribution and/or intensity of the horticulture light in dependence of the sensor signal.

In further embodiments, the sensor may comprise a light sensor configured to sense ambient light, and to provide a related light sensor signal (to the control system), especially wherein the control system may be configured to (have the lighting system) provide the horticulture light and/or supplemental light based on the light sensor signal. Hence, in embodiments the horticulture light may be provided in dependence of a light sensor signal (or another sensor signal).

In embodiments, based on a feedback signal of the sensor(s) a (predetermined) spectral distribution and/or spectral power of the horticulture light may be provided.

Hence, in yet a further aspect the invention provides a horticulture system (for a Basil plant), wherein the horticulture system comprising an indoor facility and the horticulture lighting arrangement as defined herein. The horticulture lighting arrangement may especially be configured to provide the horticulture light in the indoor facility (for growing of the Basil plant); see also above. In specific embodiments, the horticulture system comprises a plurality of first light generating devices or lighting apparatus as defined above, in specific embodiments configured at different first heights (h1) of the light emitting surfaces above a grow substrate, wherein in the operational mode the contribution of far-red light to the horticulture light during the end-of-day period is controlled as function of the first heights (h1) of the light emitting surfaces above the substrate. Instead of the term "light emitting surface", also the term "final window" or "exit window" or "exit surface" may be applied (see also above). The second light generating devices may be configured above the plants, or may in specific embodiments also be configured at different heights (above the substrate).

In embodiments, the horticulture system, or horticulture lighting arrangement, may comprise a control system. The control system may be configured to control (part of) the horticulture system. In further embodiments, the control system may be configured to control the lighting system, the lighting device(s) and/or lighting apparatus. In further embodiments, the control system may be configured to control the sensor.

The conditions to which the (growing) plant is subjected may in general be defined in a growth recipe. Hence, the control system may be configured to, during operation, subject the plant to a growth recipe. The growth recipe may include a light recipe, which may define a predetermined horticulture light setting, e.g., a horticulture light intensity. This may include that the light recipe also defines a predetermined horticulture light intensity over time. Alternatively or additionally, the light recipe may define a predetermined horticulture light intensity as function of a parameter, especially a parameter determined with the sensor.

In further embodiments, the parameter may comprise a plant-related parameter selected from the group comprising a nutrient, a leaf size, a plant temperature, a plant leaf temperature, a plant root temperature, a plant stem length, a plant fruit size, etc. In further embodiments, the parameter may comprise an environmental parameter selected from the group comprising a temperature, a humidity, a gas composition (in the horticulture system, especially in the horticulture system), and a natural sunlight intensity (in case also natural sunlight would be applied). A "light recipe" generally indicated a set of lighting parameters. A light recipe may be comprised by a recipe that also include other parameters, such as an imposed temperature, especially at a plant part, such as at a plant leaf, or such as at a plant root.

In embodiments, the control system may be configured to control the spectral composition of the horticulture light as function of one or more of (i) number and/or appearance and/or color of leaves of the plant, (ii) area and/or color of a canopy of the plant, and (iii) number and/or appearance of flowers of the plant.

In embodiments, the control system may be configured to control the horticulture lighting arrangement as well as other aspects of the horticulture system. Especially, the control system may be configured to control one or more of temperature, humidity, irrigation, nutrient supply, light intensity of the horticulture light, air conditions including one or more of air temperature, air composition, air flow, etc. of the horticulture system. The control system may be configured to control one or more of these conditions at different locations in the arrangement.

In embodiments, the control system may be configured to control the sensor. In embodiments, the control system may be configured to (have the horticulture system) execute the method of the invention (see below). In a further aspect, the invention may further provide the lighting apparatus or light generating device as such. In a further aspect, the invention may further provide the sensor as such. In a further aspect, the invention may further provide the horticulture lighting arrangement as such.

In a further aspect, the invention provides a method of providing horticulture light to a Basil plant. Such method may also be comprised by a method for cultivating a Basil plant (or Basil cultivar). Especially, the method may be applied with the herein described horticulture lighting arrangement and/or the herein described horticulture system. Amongst others, the method may comprise: providing during a controlling mode horticulture light to the Basil plant according to an on-off schedule wherein consecutively an on-period and an off-period are applied. As indicated above, especially the horticulture light comprises one or more of first horticulture light comprising a wavelength selected from the range of 400-600 nm, red light comprising a wavelength selected from the range of 600-700 nm, and far-red light comprising a wavelength selected from the range of 700-800 nm. Further, as indicated above, especially the on-period may in embodiments last in in the range of 12-20 hours and the off-period may in embodiments last in the range of 4-12 hours. Further, especially before commencing the off-period, the on-period comprises an end-of-day period at the end of the on-period.

In order to obtain an (increase in) chilling resistance of the Basil plant, during at least part of the on-period before the end-of-day period a R/Fr ratio, defined as a ratio $I_{600\text{-}700\ nm}/I_{700\text{-}800\ nm}$ of red light and far-red light, is selected from the range of 4-20, and during at least part of the end-of-day period the R/Fr ratio is selected from the range of 0.1-4. Hence, especially the invention also provides in embodiments a method of providing horticulture light to a Basil plant, the method comprising: providing during a controlling mode horticulture light to the Basil plant according to an on-off schedule wherein consecutively an on-period and an off-period are applied, wherein: (i) the horticulture light comprises one or more of first horticulture light comprising a wavelength selected from the range of 400-600 nm, red light comprising a wavelength selected from the range of 600-700 nm, and far-red light comprising a wavelength selected from the range of 700-800 nm; (ii) the on-period lasts in in the range of 12-20 hours and the off-period lasts in the range of 4-12 hours, wherein the on-period comprises an end-of-day period at the end of the on-period; and (iii) wherein during at least part of the on-period before the end-of-day period, especially during the entire on-period before the end-of-day period, a R/Fr ratio, defined as a ratio $I_{600\text{-}700\ nm}/I_{700\text{-}800\ nm}$ of red light and far-red light, is selected from the range of 4-20, and during at least part of the end-of-day period, especially during the entire end-of-day period, the R/Fr ratio is selected from the range of 0.1-4, wherein the R/Fr ratio during the at least part of the on-period (D) is larger than the R/Fr ratio during the at least part of the end-of-day period (EOD).

In specific embodiments, the on-period may last in in the range of 14-19 hours and/or the off-period may last in the range of 5-10 hours. Further, especially in embodiments the end-of-day period may last in the range of 1-3 hours.

In specific embodiments, during part of the end-of-day period first horticulture light, red light, and far-red light are provided. Further, in embodiments the end-of-day period lasts in the range of 0.5-4 hours. In specific embodiments, the Basil plant may be a Basil cultivar selected from the group consisting of Cinnamon, Dolly, Emily, and Lemon. Especially with these cultivars a (substantial) increase in chilling resistance using the herein described methods was obtained.

In embodiments, the method may comprise providing (in the operational mode) during the on-period the horticulture light to the Basil plant with an average intensity selected from the range of at least 50 $\mu mol/m^2/s$. In further specific embodiments, the method may comprise providing the horticulture light (in the operational mode) during the on-period with an average intensity selected from the range 100-600 $\mu mol/m^2/s$ to the Basil plant. Especially, in embodiments the method may comprise providing the horticulture light (in the operational mode) during the on-period with an average intensity selected from the range 150-450 $\mu mol/m^2/s$ to the Basil plant. These intensities are the intensities the plant receives, and may e.g. be approximated by the intensity at the location of the substrate on or in which the plant grows.

In specific embodiments, the horticulture light during at least part of the on-period before the end-of-day period may comprise 5-20% of the photons in wavelength range of 400-500 nm, 0-30% of the photons in wavelength range of 500-600 nm, 50-95% of the photons in wavelength range of 600-700 nm, and 0-6% of the photons in wavelength range of 700-800 nm, with the aggregate contribution of photons from different wavelength ranges not exceeding 100%. Alternatively or additionally, especially the horticulture light during at least part of the end-of-day period may comprise 0-10% of the photons in wavelength range of 400-500 nm, 0-15% of the photons in wavelength range of 500-600 nm, 0-80% of the photons in wavelength range of 600-700 nm, and 20-100% of the photons in wavelength range of 700-800 nm, with the aggregate contribution of photons from different wavelength ranges not exceeding 100%.

As indicated above, in embodiments the method may further comprise controlling (in an operational mode) the contribution of far-red light to the horticulture light during the end-of-day period as function of one or more of (i) a growth time, growth phase or age of one or more plants, and (ii) a canopy density (defined by one or more plants). Alternatively or additionally, method may further comprise controlling (in an operational mode) the contribution of far-red light to the horticulture light during the end-of-day period as function of the height at which the horticulture light is generated above the substrate on or in which the plant grows or above the canopy of the plant grown. Hence, in specific embodiments the method may further comprise controlling (in the operational mode) the contribution of far-red light to the horticulture light during the end-of-day period as function of a position relative to a canopy of the Basil plant where the far-red light is provided.

Further, as indicated above the far-red enriched light may be provided during end-of-day period or alternatively only during end-of-day periods in part (especially the last part) of the total growth period. Hence, in specific embodiments the method may comprise growing the Basil plant over a growing period t, wherein t is at least three weeks, and wherein the method further comprises (i) applying during a first part of the growing period t during the entire on-periods horticulture light have a R/Fr ratio of at least 4, and (ii) applying during a second part of the growing period t during at least part of the end-of-day periods (EOD) horticulture light having the R/Fr ratio selected from the range of 0.1-4.

In embodiments, the method may comprise providing supplemental horticulture light, e.g., far-red light, to a plant wherein the supplemental horticulture light is provided such that a minimum level (and maximum level) of light intensity of a supplemental wavelength range, e.g., the far-red wavelength range, is provided to the plant during the herein indicated on-periods and end-of-day periods. This may herein also be indicated as "supplemental controlling mode". This supplemental controlling mode is especially useful to supplement known methods wherein on-off schedules of horticulture lighting arrangements provide no or nearly no far-red light to the plant(s).

In embodiments, the method may comprise providing horticulture light to the plant, especially during a controlling mode. In further embodiments, the horticulture light may have an average intensity (on the plant)$\geq 50$ $\mu mol/m^2/s$, such as $\geq 100$ $\mu mol/m^2/s$, like even more especially $\geq 150$ $\mu mol/m^2/s$, such as especially selected from the range of 50-1000 $\mu mol/m^2/s$, even more especially selected from the range of 150-1000 $\mu mol/m^2/s$. In further embodiments, the first horticulture light may have an average intensity selected from the range of 200-1000. In embodiments, the intensity is $\leq 800$ $\mu mol/m^2/s$, such as $\leq 600$ $\mu mol/m^2/s$, like selected from the range of 200-600 $\mu mol/m^2/s$, such as especially from the range of 200-525 $\mu mol/m^2/s$.

Especially, the indicated light intensities may be provided over an on-period (light or day) of 10-20 hours per day, followed by an off-period (darkness or night) of 4-14 hours per day.

The conditions to which the (growing) plant is subjected may in general be defined in a growth and/or light recipe (see above). Hence, the method may comprise subjecting the plant to a growth and/or light recipe.

In embodiments, the method may comprise controlling the spectral composition of the horticulture light as function of (i) number and/or appearance and/or color of leaves of the plant, (ii) area and/or color of a canopy of the plant, and (iii) number and/or appearance of flowers of the plant.

Hence, in embodiments, the method may comprise sensing one or more of (i) number and/or appearance and/or color of leaves of the plant, (ii) area and/or color of a canopy of the plant, and (iii) number and/or appearance of flowers of the plant.

In yet a further aspect, the invention also provides a computer program product which, when running on a computer, especially the control system described herein, which is functionally coupled to or comprised by a horticulture lighting system, causes the horticulture lighting system to carry out the method of the invention.

Therefore, the invention further provides a computer program product enabled to carry out the method as defined herein, for instance when loaded on a computer (that is functionally coupled to the horticulture lighting system). In yet a further aspect, the invention provides a record carrier (or data carrier, such as a USB stick, a CD, DVD, etc.) storing the computer program product.

Percentages of photons mentioned herein relate to the total number of photons in the spectral range of 400-800 nm. Hence, e.g. the phrase "n % of the photons of the horticulture light" and similar phrases indicate that out of all photons (of the horticulture light) having a wavelength selected from the range of 400-800 nm n/100 is in the specifically indicated subrange. This does not exclude that the horticulture light, such as may be provided by the herein described lighting apparatus or light generating device provides also other radiation, such as UV radiation. However, for the herein described invention, the number of photons relate to the total number of photons in the 400-800 nm range. As indicated elsewhere, "essentially" may amongst others especially refer to at least 90%, such as at least 95%.

The intensity (of the horticulture light), herein indicated as PPFD, can be determined from a photodiode or measured directly with a photomultiplier. The area in the PPFD especially refers to the local light receiving (plant) area of the space wherein the light source(s) are arranged. In case of a multi-layer system, it is the area of a relevant layer comprised in the multi-layer configuration; the PPFD may then be estimated in relation to each layer individually (see further also below). The area may be a value, in an embodiment, fed to the control unit manually, or may in an embodiment be evaluated (with e.g. sensors) by the control unit. The area ($m^2$) in phrases like "at least 150 µmol/$m^2$/s" and similar phrases may especially refer to area of a root growth medium surface. The term "root growth medium surface" may refer to the liquid level in hydroponic applications or it may refer to a top layer of a substrate, such as soil. For instance, it may refer to the "table level", i.e. the level on which the plant is configured. Especially, the phrase "at least 150 µmol/$m^2$/s" and similar phrases refers to the intensity that is received by the plant. Hence, any piece of the plant that can receive the light (i.e. especially at least those parts that are above the substrate) (in the horticulture system) may receive such dose. For instance, the number of photons per second that are received per square meter at a top part of the plant and at a bottom part (but still accessible by the light) of the plant may be measured. The dose can then be calculated. The dose received at the plant may be approximated by the dose received at the root growth medium surface. When the indicated intensity is received at the root growth medium surface or table level (in the absence of plants), then the plant will also receive at least such intensity. Especially, the term "root growth medium surface" may refer to a horizontal planar (average) surface.

The term "mode" may also be indicated as "controlling mode". The system, or apparatus, or device (see further also below) may execute an action in a "mode" or "operation mode" or "mode of operation" or "controlling mode". Likewise, in a method an action or stage, or step may be executed in a "mode" or "operation mode" or "mode of operation" or "controlling mode". This does not exclude that the system, or apparatus, or device may also be adapted for providing another controlling mode, or a plurality of other controlling modes. Likewise, this does not exclude that before executing the mode and/or after executing the mode one or more other modes may be executed. However, in embodiments a control system (see further also below) may be available, that is adapted to provide at least the controlling mode. Would other modes be available, the selection of such modes may especially be executed via a user interface, though other options, like executing a mode in dependence of a sensor signal or a (time) scheme, may also be possible. The operation mode may in embodiments also refer to a system, or apparatus, or device, that can only operate in a single operation mode (i.e. "on", without further tunability).

The term "controlling" and similar terms especially refer at least to determining the behavior or supervising the running of an element (here the horticulture system or one or more elements thereof). Hence, herein "controlling" and similar terms may e.g. refer to imposing behavior to the element (determining the behavior or supervising the running of an element), etc., such as e.g. measuring, displaying, actuating, opening, shifting, changing temperature, etc. Beyond that, the term "controlling" and similar terms may additionally include monitoring. Hence, the term "controlling" and similar terms may include imposing behavior on an element and also imposing behavior on an element and monitoring the element. The controlling of the element can be done with a control system, which may also be indicated as "controller". The control system and the element may thus at least temporarily, or permanently, functionally be coupled. The element may comprise the control system. In embodiments, the control system and element may not be physically coupled. Control can be done via wired and/or wireless control. The term "control system" may also refer to a plurality of different control systems, which especially are functionally coupled, and of which e.g. one control system may be a master control system and one or more others may be slave control systems. A control system may comprise or may be functionally coupled to a user interface. Examples of user interface devices include a manually actuated button, a display, a touch screen, a keypad, a voice activated input device, an audio output, an indicator (e.g., lights), a switch, a knob, a modem, and a networking card, among others. Especially, the user interface device may be configured to allow a user instructing the device or apparatus or system, with which the user interface is functionally coupled or by with the user interface is functionally comprised. The user interface may especially include a manually actuated button, a touch screen, a keypad, a voice activated input device, a switch, a knob, etc., and/or optionally a modem, and a networking card, etc. The user interface may comprise a graphical user interface. The term "user interface" may also refer to a remote user interface, such as a remote control. A remote control may be a separate dedicate device. However, a remote control may also be a device with an App configured to (at least) control the system or device or apparatus. A user interface is especially functionally coupled to a control system or may be comprised by a control system.

Basically the same embodiments as described in relation to the method may also apply to the horticulture system, especially to the lighting apparatus. The horticulture system especially the lighting apparatus, may especially be used in the herein described method and/or in the herein described horticulture lighting system.

With the invention, chilling resistance of e.g. harvested basil plants, especially their leaves, may be improved.

BRIEF DESCRIPTION OF THE DRAWINGS

Embodiments will now be described, by way of example only, with reference to the accompanying schematic drawings in which corresponding reference symbols indicate corresponding parts, and in which:

FIG. 2B shows pictures of *Basilicum* canopies.

DETAILED DESCRIPTION OF THE EMBODIMENTS

Figure 1A:
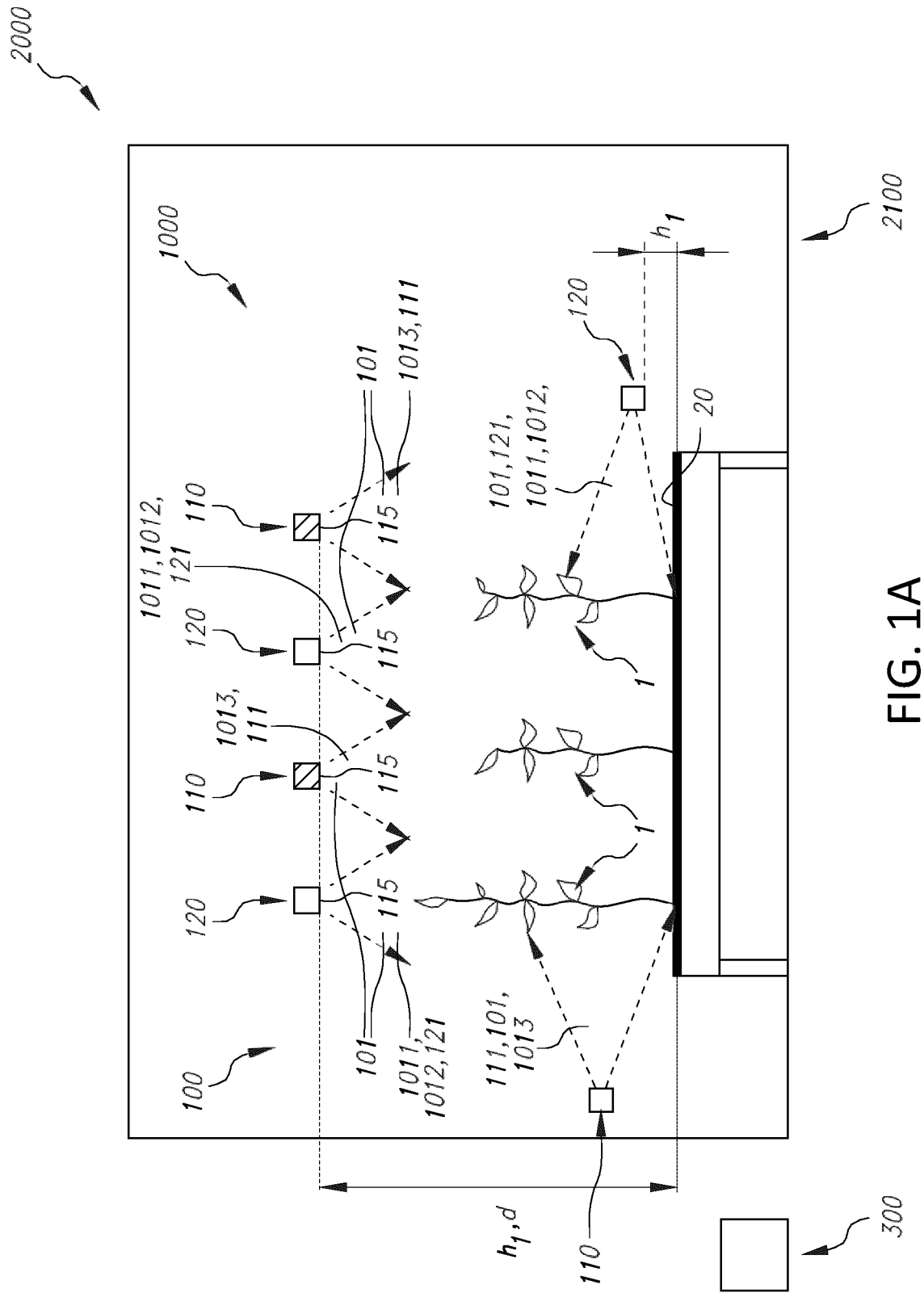
FIGS. 1A-1E schematically depict some embodiments and aspects. The schematic drawings are not necessarily to scale.

FIG. 1A schematically depicts an embodiment of a horticulture lighting arrangement 1000. The arrangement 1000 comprises a lighting system 100 configured to provide horticulture light 101 to a plant 1, e.g. a Basil plant 1, the horticulture light 101 having a controllable spectral power and spectral power distribution, and a control system 300 configured to control the spectral power and spectral power distribution of the horticulture light 101.

The horticulture lighting arrangement 1000 comprises one or more light generating devices. Here, by way of example the horticulture lighting arrangement 1000 comprises first light generating devices 110 and second light generating devices 120. The former is configured to generate first device light 111, and the latter is configured to generate second device light 121. The horticulture light 101 may comprise one or more of the first device light 111 and the second device light 121.

The horticulture lighting arrangement 1000 may especially be configured to provide (in an operational mode of the horticulture lighting arrangement 1000) the horticulture light 101 according to an on-off schedule wherein consecutively an on-period D and an off-period N are applied.

The horticulture light 101 comprises one or more of first horticulture light 1011 comprising a wavelength selected from the range of 400-600 nm, red light 1012 comprising a wavelength selected from the range of 600-700 nm, and far-red light 1013 comprising a wavelength selected from the range of 700-800 nm. As schematically depicted, in this embodiment the first light generating device 110 is configured to generate first device light 111 comprising far-red light 1013, and a second light generating device 120 configured to generate second device light 121 comprising one or more of first horticulture light 1011 and red light 1012. Other embodiments may also be possible. For instance, the first device light 111 may also comprise (some) red light 1012 and the second device light 121 may also comprise (some) far-red light 1013.

The on-period D may in embodiments last in in the range of 12-20 hours. The off-period N may in embodiments last in the range of 4-12 hours. Especially, the on-period D comprises an end-of-day period EOD at the end of the on-period D. This end-of-day period EOD lasts in embodiments in the range of 0.5-4 hours. Further, during at least part of the on-period D before the end-of-day period EOD a R/Fr ratio, defined as a ratio $I_{600-700\ nm}/I_{700-800\ nm}$ of red light 1012 and far-red light 1013, may especially be selected from the range of 4-20. Further, in embodiments during at least part of the end-of-day period EOD the R/Fr ratio may be selected from the range of 0.1-4. Especially, the end-of-day period EOD lasts in embodiments in the range of at least 1 hour.

Hence, in specific embodiments during the on-period D before the end-of-day period EOD a contribution of the first device light 111 to the horticulture light 101 (comprising one or more of the first device light 111 and the second device light 121) may be less than 10%, and during at least part of the end-of-day period EOD a contribution of the first device light 111 to the horticulture light 101 (comprising one or more of the first device light 111 and the second device light 121) may be at least 20%.

As indicated above, the fact that during the EOD period there is far-red light does not exclude the presence of also other types of light, like red light. Likewise, the fact that during the on-period part preceding the EOD period there is one or more of first horticulture light and red light (which may together be PAR light), does not exclude the presence of other types of light, like far-red light. Hence, in embodiments during part of the end-of-day period EOD first horticulture light 1011, red light 1012, and far-red light 1013 are provided.

Reference h1 indicates a height above a substrate 20 (or average substrate surface, such as water, soil, etc.). This height or distance is measured from a light emitting surface 115 or exit surface of a light generating device. The distance is indicated with reference d, which is for the light generating devices 110,120 which are configured above the plants 1 the same as the height h1.

FIG. 1A also schematically depicts an embodiment of a horticulture system 2000, especially for a plant, such as more especially for a Basil plant 1. The horticulture system 2000 especially comprises an indoor facility 2100. Further, the horticulture system 2000 comprises the horticulture lighting arrangement 1000 as defined herein. In embodiments, the horticulture lighting arrangement 1000 may especially be configured to provide the horticulture light 101 in the indoor facility 2100, especially for growing of the (Basil) plant 1.

In embodiments, the horticulture system 2000 comprises a plurality of light generating devices 110, configured at different first heights h1 of the light emitting surfaces 115 (or exit surfaces) above the substrate 20; see e.g. in FIG. 1A the light generating devices 110 above and next to the plant(s) 1. As indicated above, in embodiments the lighting system 100 may comprise the first light generating device 110, which may especially be configured to generate at least part of the far-red light 1013. The first light generating device 110 may comprise a light emitting surface 115 (see also above), of which during operation far-red light 1013 emanates. In the operational mode the contribution of far-red light 1013 to the horticulture light 101 during the end-of-day period EOD may be controlled as function of the first heights h1 of the light emitting surfaces 115 above the substrate 20. Hence, in embodiments the method may (further) comprise controlling (in the operational mode) the contribution of far-red light 1013 to the horticulture light 101 during the end-of-day period EOD as function of a position of the corresponding light generating device 110 relative to a canopy of the Basil plant 1 to which the far-red light 1013 is provided.

Especially, the horticulture lighting arrangement 1000 is configured to provide during the on-period D the horticulture light 101 with an average intensity selected from the range of at least 50 μmol/m²/s, especially selected from the range 100-600 μmol/m²/s at a distance d from the light generating devices 110, 120 of the lighting system 100 of at least 30 cm. Further, in embodiments the horticulture light 101 during at least part of the on-period D before the end-of-day period may comprise 5-20% of the photons in wavelength range of 400-500 nm, 0-30% of the photons in wavelength range of 500-600 nm, 50-95% of the photons in wavelength range of 600-700 nm, and 0-6% of the photons in wavelength range of 700-800 nm, with the aggregate contribution of photons from different wavelength ranges not exceeding 100%. Yet further, in embodiments the horticulture light 101 during at least part of the end-of-day period EOD may comprise 0-10% of the photons in wavelength range of 400-500 nm, 0-15% of the photons in wavelength range of 500-600 nm, 0-80% of the photons in wavelength range of 600-700 nm, and 20-100% of the photons in wavelength range of 700-800 nm, with the aggregate contribution of photons from different wavelength ranges not exceeding 100%.

As indicated above, in the operational mode the contribution of far-red light 1013 to the horticulture light 101 during the end-of-day period EOD is controlled as function of one or more of a growth time, a growth phase or age of one or more plants 1, and a canopy density (defined by one or more plants 1). A way to estimate the canopy density is e.g. a shadow measurement.

Figure 1B:
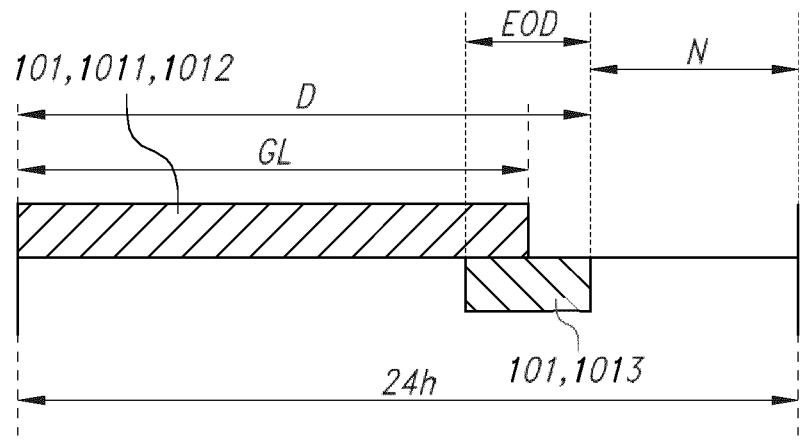
Figure 1C:
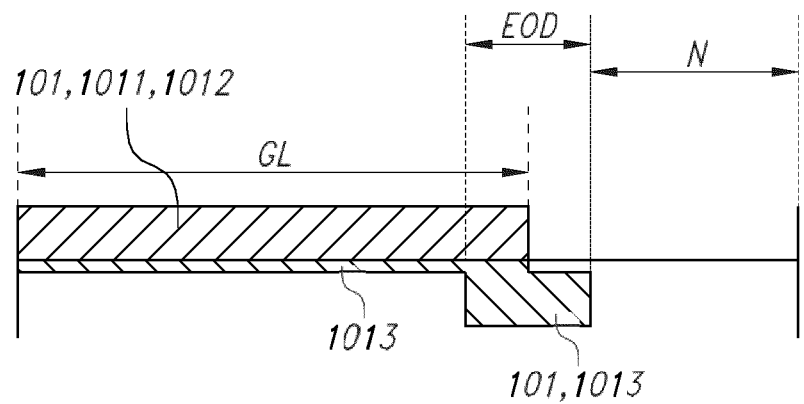

FIGS. 1B-1C schematically depict a non-limiting number of embodiments of the day-night horticulture lighting scheme, with D indicating providing horticulture light (day-period), and N indicated essentially not providing horticulture light (night period). The horticulture light 101 that is mainly used for growing may be indicated as grow light GL.

This horticulture light 101 may comprise one or more of first horticulture light 1011 comprising a wavelength selected from the range of 400-600 nm and red light 1012 comprising a wavelength selected from the range of 600-700 nm. Optionally, however, see also FIG. 1C, this grow light may comprise far-red light 1013 (comprising a wavelength selected from the range of 700-800 nm). During essentially the last part of the day period, (additional) far-red light 1013 may be provided. This may partly overlap in time with the time grow light is provided, though this is not necessarily the case. After the far-red EOD period, the night period N may commence.

Hence, FIGS. 1B-1C schematically depict an embodiment of a method of providing horticulture light (to a Basil plant) wherein the method comprises: providing during a controlling mode horticulture light 101 (to the Basil plant 1, see FIG. 1A) according to an on-off schedule wherein consecutively an on-period D and an off-period N are applied. The horticulture light 101 comprises one or more of first horticulture light 1011 comprising a wavelength selected from the range of 400-600 nm, red light 1012 comprising a wavelength selected from the range of 600-700 nm, and far-red light 1013 comprising a wavelength selected from the range of 700-800 nm. Further, the on-period D may last in in the range of 12-20 hours and the off-period N may last in the range of 4-12 hours, wherein the on-period D comprises an end-of-day period EOD at the end of the on-period D. Yet further, during at least part of the on-period D before the end-of-day period a R/Fr ratio, defined as a ratio $I_{600-700\ nm}/I_{700-800\ nm}$ of red light 1012 and far-red light 1013, is selected from the range of 4-20, and during at least part of the end-of-day period EOD the R/Fr ratio is selected from the range of 0.1-4. Especially, the end-of-day period EOD may last in the range of 0.5-4 hours.

As schematically depicted in FIGS. 1B-1C, during part of the end-of-day period EOD first horticulture light 1011, red light 1012, and far-red light 1013 may (also) be provided. Likewise, some far-red light 1013 may also be available during the part of the day period preceding the EOD.

FIGS. 1B-1C only depict a single cycle. Such cycles may (continuously) be repeated during one or more weeks, especially a plurality of weeks (see also FIG. 1E).

Figure 1D:
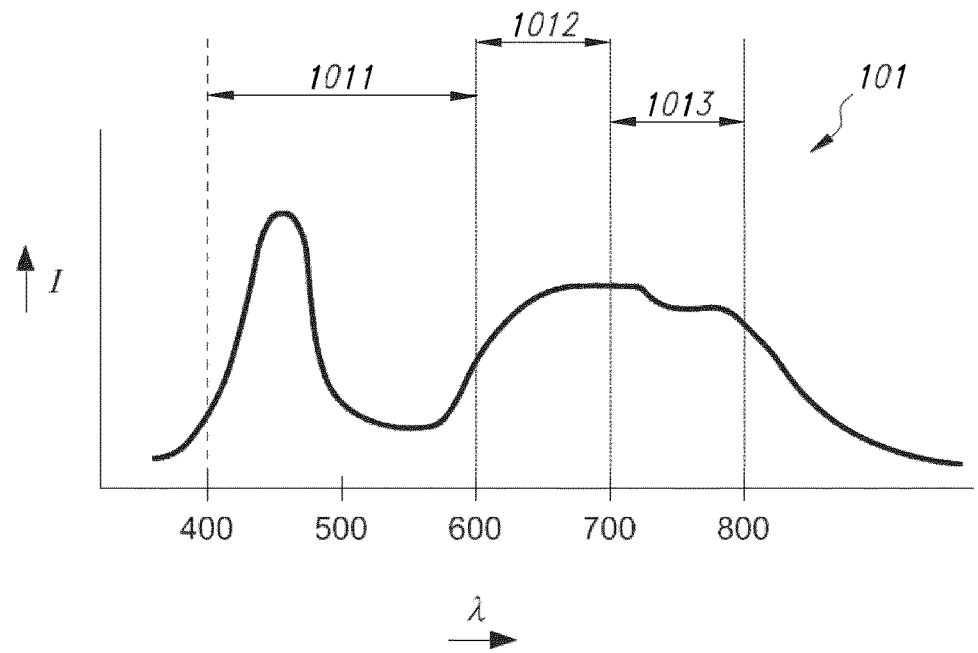
Figure 1E:
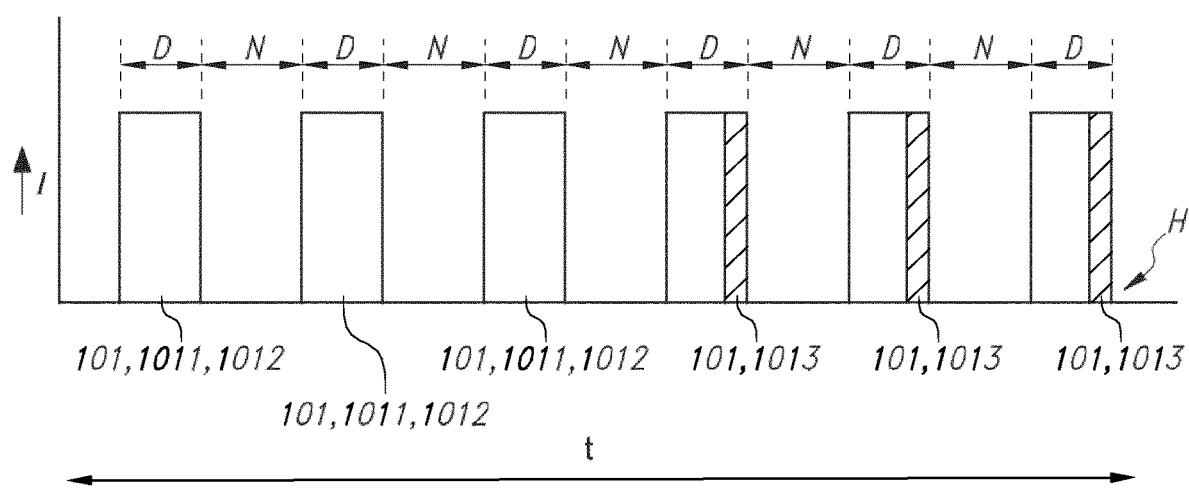

FIG. 1D schematically depicts a spectral powder distribution of an embodiment of horticulture light 101. Of course, completely other spectral power distributions may also be possible. Here, by way of example essentially all types of horticulture light mentioned herein are available, including first horticulture 1011 light which may have intensity in the blue and/or green, especially at least blue, red light 1012, which may have intensity in the red, and far-red light 1013, which may have intensity in the far-red. During the day period, the spectral power distribution of the horticulture light may substantially change when moving from the period preceding EOD into the EOD period.

Whether or not EOD light is applied, may also depend upon the growth stage, growth time or age of the plant. This is very schematically depicted in FIG. 1E. Here, an embodiment is schematically depicted of a method comprising growing the Basil plant over a growing period t, wherein t may in embodiments be at least three weeks, and wherein the method may further comprise applying during a first part of the growing period t during the entire on-periods D horticulture light 101 having a R/Fr ratio of at least 4 (see schematically the first three days D), and applying during a second part of the growing period t during at least part of the end-of-day periods EOD the horticulture light 101 having the R/Fr ratio selected from the range of 0.1-4 (see schematically the second three days D). The height of the bars and the width of the bars are not on scale, and are only schematically.

*Basilicum* (*Ocimum basilicum* L.) is a culinary herb, which can provide aroma. People use the aroma of fresh leaves in food to adjust the flavor. During the storage process, basil easily gets a chilling injury when the temperature is lower than 12° C. Chilling injuries are seen as a dark spot on the leaf, wilting and loss of aroma. This invention relates amongst others to a method for optimizing the use of far-red light to induce chilling resistance on basil plant during their growth with an optimum light sequences such that energy is saved and unnecessary far-red exposure inducing unwanted physiological changes on the plant is achieved.

Applying short day photoperiod (<15 h) versus long day (18 h) may improve also sometimes the chilling resistance. However, a long day photoperiod is most beneficial for a grower as the grower than would make most beneficial use (in terms of hours of use) of the lighting system he has installed. Applying far-red during all day. on the other hand, may lead to *Basilicum* stretching too much (under this prolonged exposure to far-red) but it would improve the chilling resistance of the *Basilicum*.

When planting in high density for optimizing the growth and light use efficiency, a natural shading of the plant canopy occurs and therefor enable towards the end of the growth a low R:FR ratio on the plants. Therefore a dynamic dosing of far-red could take into account the natural R:FR variation due to the canopy in order to reduce energy usage of far-red light during the growth. Camera or sensor aided light control would enable a direct adjustment of the light level (red or far-red) in order to maintain the R:FR dose on the plant leaves.

Amongst others of Cinnamon, Dolly, Emily, and Lemon cultivars were tested. These all showed an increase in chilling resistance, especially when relatively longs days were applied, such as at least 14 hours, even more especially at least 16 hours. Cinnamon cultivar appeared to be extremely responsive to far-red.

Experimental Evidence

Determining the R:FR Range

Figure 2A:
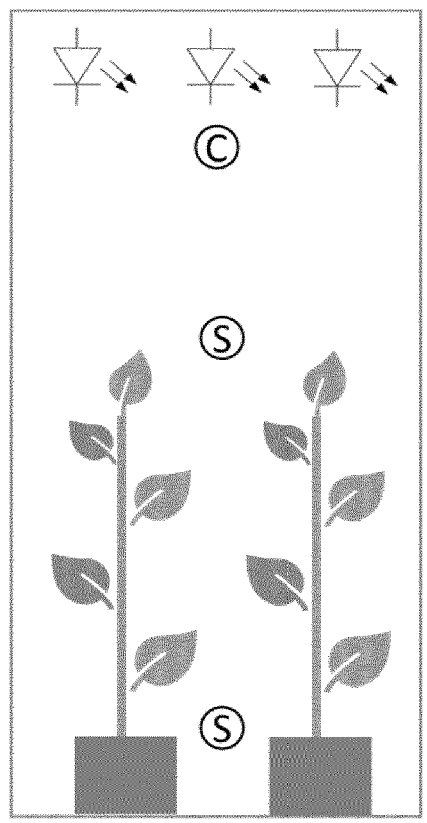
FIGS. 2A-2B illustrate the varying canopy R:FR ratio occurring due to canopy shading and depending on plant density. The left part of FIG. 2A illustrates the measurement method and the right part of FIG. 2A shows the R:FR ratio values as a function of plant growth for two different planting densities.
Figure 2A:
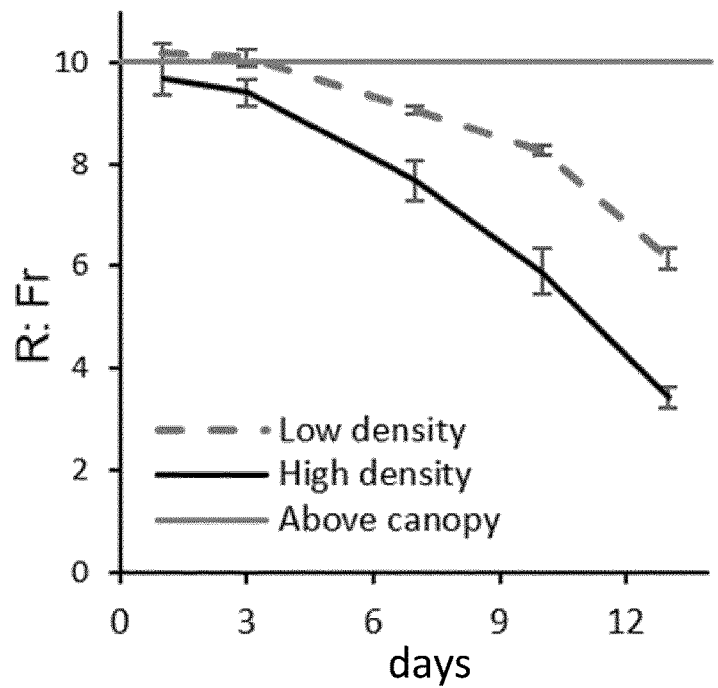
Figure 2B:

Support for the range of low R:FR range of 0.1 to 4 is provided as follows and based on the following considerations. Far-red wavelengths are known to signal the presence of shade to plants which triggers a specific behavior of the plants and leaves. When growing plants in a farm, plant density—in terms of number of plants per area—may lead to the creation of shades in a canopy as the plants grow. FIG. 2B illustrated the effect of canopy size on the the creation of shadows underneath the canopy top. The left pictures in FIG. 2B are taken at position C (camera position) as indicated in the left part of FIG. 2A. The pictures as the right in FIG. 2B are taken at a position near the substrate indicated as the lower position S (sensor position) in the left part of FIG. 2A. When measuring light transmission in a canopy, the first thing noticed is that, as you lower the sensing position into the crop (see lower position S in the left part of FIG. 2A), the Photosynthetic Active Radiation light level (PAR light, covering the wavelengths ranging from 400-700 nm) strongly decreases. This decrease is stronger and more abrupt with higher plant density. The second thing to notice is that this decrease in intensity is much less for far-red light (which is in the range between 700-800 nm). This is because of the low leaf absorption and high leaf transmission of wavelengths above 700 nm. This means that as the plant canopy is growing, the R:FR ratio perceived by the *basilicum* canopy, especially at lower locations in the canopy, is changing over time. The right part of FIG. 2A shows the changes in measured R:FR ratio at the bottom of the canopy as a function of plant growth (horizontal axis represents time in terms of days of growth) for two different planting densities.

State of the art horticulture lighting apparatus may comprise a small amount of far-red (5% to 7%) and as a result provide a R:FR ratio of 10 or more. The inventors have seen that *Basilicum* grown under these conditions is sensitive to chilling. In order to significant improve the chilling resistance, the inventors have found that the R:FR ratio needs to be lowered, i.e. the amount of far-red needs to be increased. The shade naturally occurring in a canopy during growth creates a de facto R:FR ratio for the lower leaves of 6 or 4 (see right part of FIG. 2A) depending on planting density. It has been found that the lower leaves of harvested *Basilicum* plants grown at high planting densities, i.e. leaves that have experienced substantial shadow periods wherein increased far-red is present, showed improved chilling resistance. Therefore, the inventors consider an amount of additional far-red in the horticulture light corresponding with a R:FR ratio of 4 as a minimum amount to achieve a chilling resistance effect in *Basilicum*. Therefore, in order to have a significant effect on chilling resistance the R:FR ratio should be bellow 4. As most of the currently available far-red light sources, such as far-red LED, also have some of their spectral power in the red part of the spectrum, i.e. the tail of the spectral distribution of the far-red LED towards the red wavelengths, there is always a small amount of red providing by the far-red LED and hence the maximum amount of far-red as expressed in a R:FR ratio of the horticulture light is 0.1, being the minimum R:FR ratio achievable.

Effect of End-of-Day Far-Red on Chilling Resistance of Basil: Cultivar Lemon

Basil cultivar Lemon was used in this experiment. Seeds were sown manually in soil trays at a density of 1000 plants per m2. Once the seeds were sown, the seed trays were covered with plastic film to keep 100% humidity and placed in darkness at 20° C. to induce germination. Two days after the sowing, the seedlings were transferred to a growth cell and illuminated under 180 μmol/m2/s of horticulture light with a red-blue LED spectrum (RB 180) in a photoperiod of 18 hours. The temperature was 24° C., and relative humidity 70%. Irrigation was applied every 24 hours, using a fixed ebb-flood system. Seven days after the sowing, the plastic films were removed. Twelve days after the sowing, the plants were transplanted to rockwool blocks of 7*7 cm, and the plant density was 100 plants per m2.

Figure 3A:
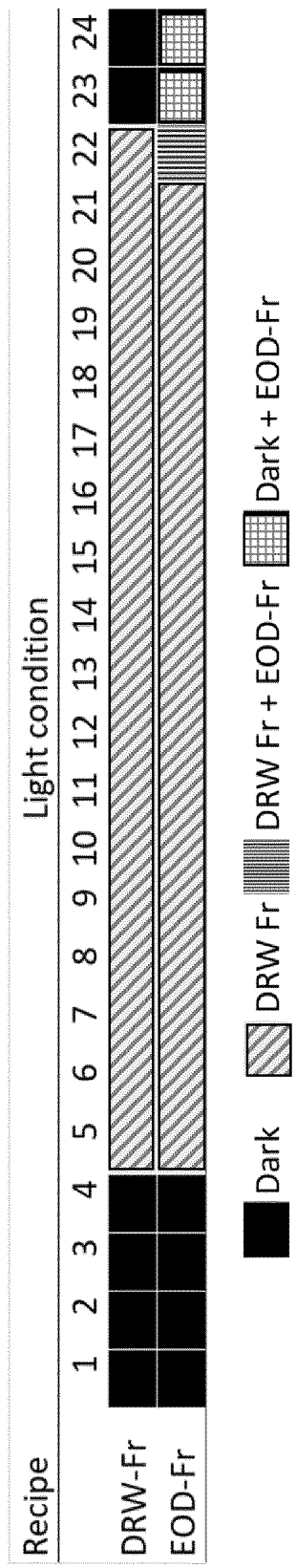
FIGS. 3A-3C illustrate the experimental setup and test results on *Basilicum* cultivar Lemon.

A control group of plants (also referred to as the DRW Fr group) was illuminated with a control horticulture light having a light intensity of 232 μmol/m2/s and a deep red+white+far-red spectrum (DRW Fr 232 μmol: 11% blue, 18% green, 71% red, 7% Far-red) during an on-period of 18 hours. The control horticulture light had a R:FR ratio of 10. An experimental group (also referred to as the EOD Fr group) of plants was illuminated using a dynamic EOD-Fr light recipe comprising the same horticulture light conditions as the control group during the first 17 hours in the on-period and additional far-red at an intensity of 164 μmol/m2/s during a three-hour end-of-day with one hour overlap with DRW Fr of the first 17 hours of the on-period, the additional far-red enabling a R:Fr ratio of 1, followed by only far red ration in hour 19 and 20, enabling a R:Fr ratio of 0.1. FIG. 3A illustrated the horticulture light recipe used in the control group and the EOD Fr group.

Sixteen days after the transplanting and subjected to the lighting conditions as set out above, the plants were harvested and some of the harvest was kept in a storage to measure shelf life and chilling resistance. It is to be noted that the total additional far-red light used in the experimental group relative to the control group added up to 28 moles in total during the entire growth cycle of the *Basilicum*.

Figure 3B:
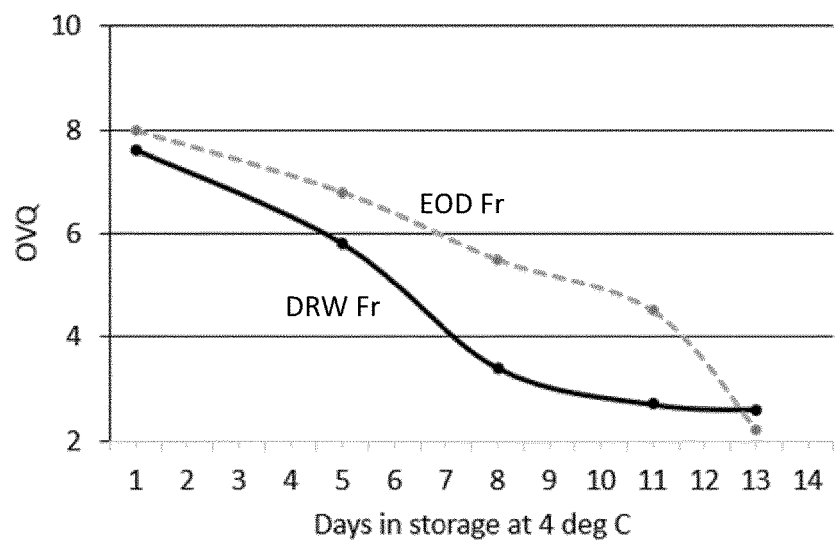
Figure 3C:
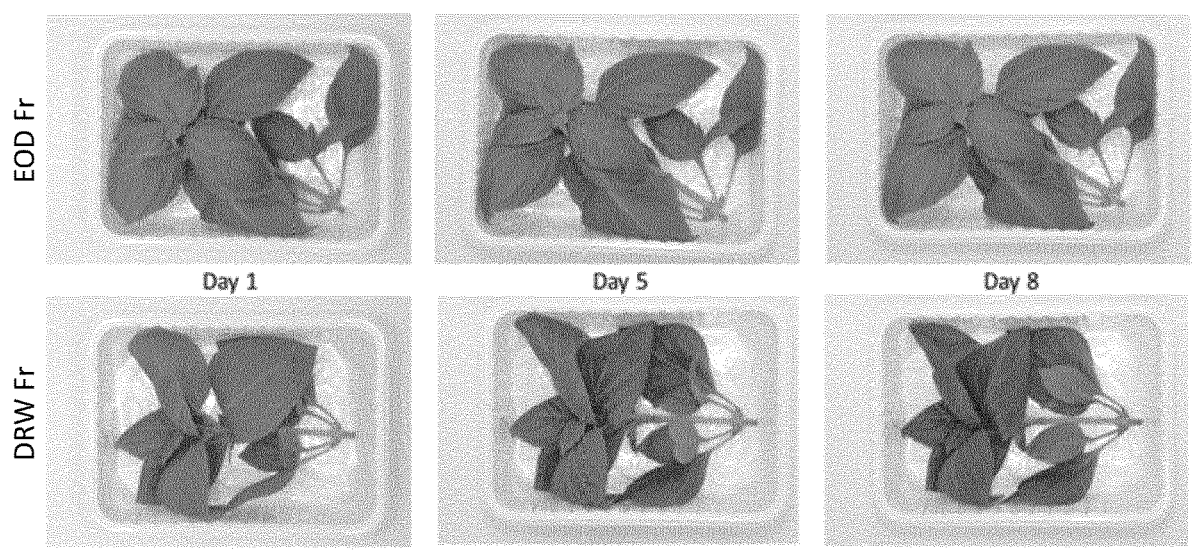

The overall visual quality (OVQ) of the *Basilicum* leaves was measured during storage on 10 samples in the control group and 10 samples in the experimental group. The concept of overall visual quality (OVQ) measurement is described in article "Systems for Scoring Quality of Harvested Lettuce" by Kader et al. and is available on http://ucce.ucdavis.edu/files/datastore/234-417. pdf. The samples were stored at 4° C. with a relative humidity of 65%. Overall visual quality was taken every two to three days, scoring according to a scale from 2-9. A customer acceptance threshold was set at score 6 on that same scale. When a sample got below that score, it is considered unsellable however assessments were nonetheless continued. The results are shown in FIGS. 3B (graphical) and 3C (pictures). FIG. 3C shows that the plants grown under DRW Fr experience significant chilling injury (darkening of the leaves) already starting at day 5 of storage whereas the plants treated with EOD Fr do not show chilling injury.

Figure 4A:
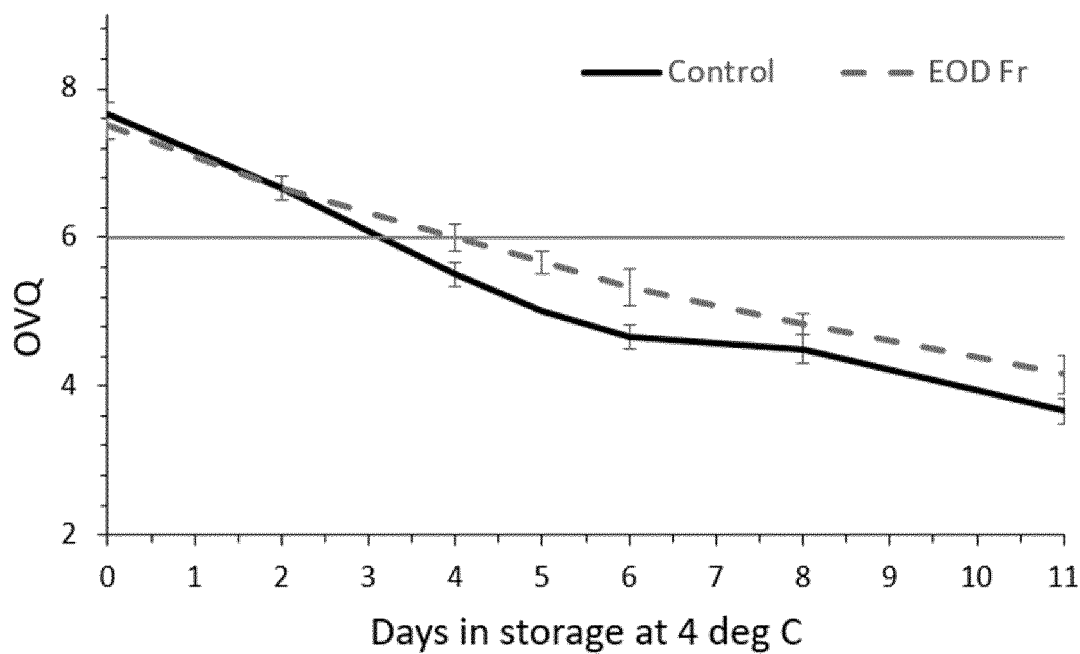
FIGS. 4A and 4B show test results on *Basilicum* cultivar Cinnamon and Dolly respectively.
Figure 4B:
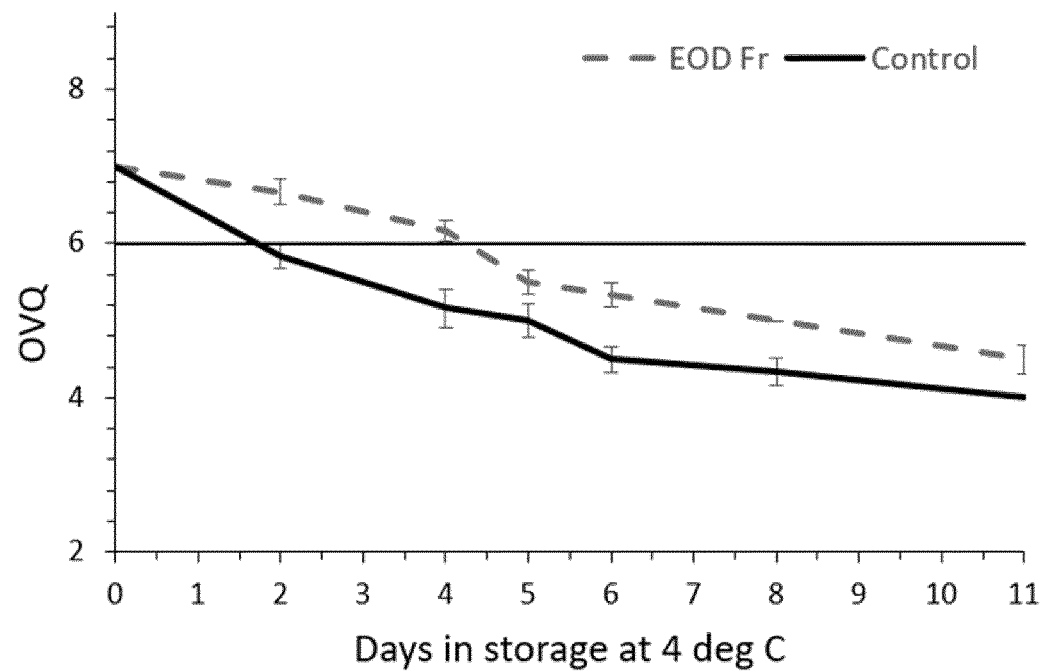

Effect of End-of-Day Far-Red on Chilling Resistance of Basil:Cultivars Cinnamon and Dolly Cultivar Cinnamon and Dolly were used for this experiment. Light settings were identical as in the experiments described above with respect to the cultivar Lemon. The results on overall visual quality (OVQ) during storage are shown in FIG. 4A for Cinnamon and FIG. 4B for Dolly.

Effect of End-of-Day Far-Red with a Ratio R:Fr~4

Cultivar Piccolino was used for this experiment. A control of these plants was illuminated with a horticulture light having a light intensity of 300 μmol/m2/s and a deep red+white+Fr spectrum (DRW Fr: 11% blue, 18% green, 71% red, 7% Far-red) in an on-period of 15 hours. The control horticulture light had a R:Fr ratio of 10. The experimental EOD-Fr light recipe comprised the same horticulture light condition as the control group during the first 14 hours of the on-period and a three-hour far-red light at an intensity of 50 μmol/m2/s was added with one hour overlap in hour 15 with the DRW Fr preceeding the end-of-day period, enabling a R:Fr ratio of 4, and then followed by only far-red light in hours 16 and 17, enabling a R:Fr ratio of 0.1.

Figure 5A:
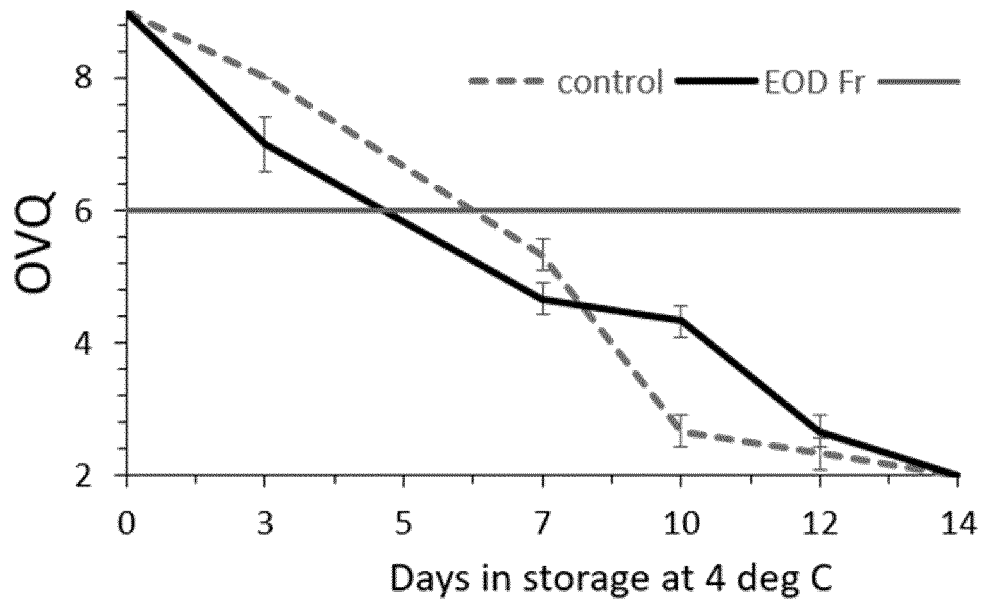
FIGS. 5A and 5B show test results on *Basilicum* cultivar Piccolino.
Figure 5B:
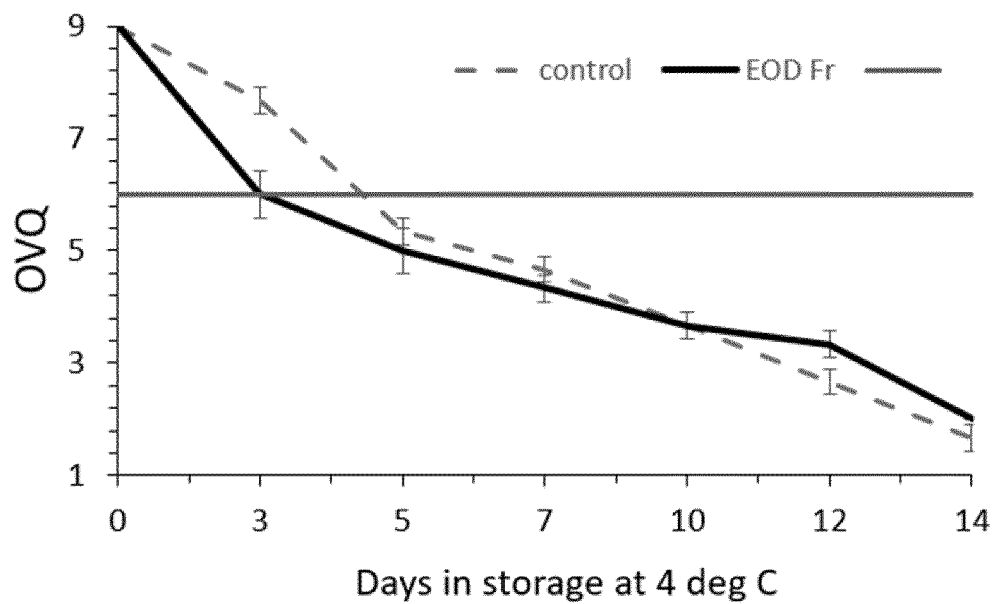

Some plants from each of the treatment groups, i.e. the control group and the EOD-Fr group, where harvested at their grow temperature of 24° C. and other plants from each of the treatment groups were harvested at a lower temperature of 16° C. while also grown on 24° C. It is known that the Piccolino cultivar is more sensitive to temperature than other *Basilicum* cultivars. The results show that harvesting temperature had a mild effect on the chilling injury and that a significant effect of the EOD Fr application is observed in both cases. The results are depicted in FIGS. 5A (harvesting temperature 24° C.) and 5B (harvesting temperature 16° C.).

Figure 6:
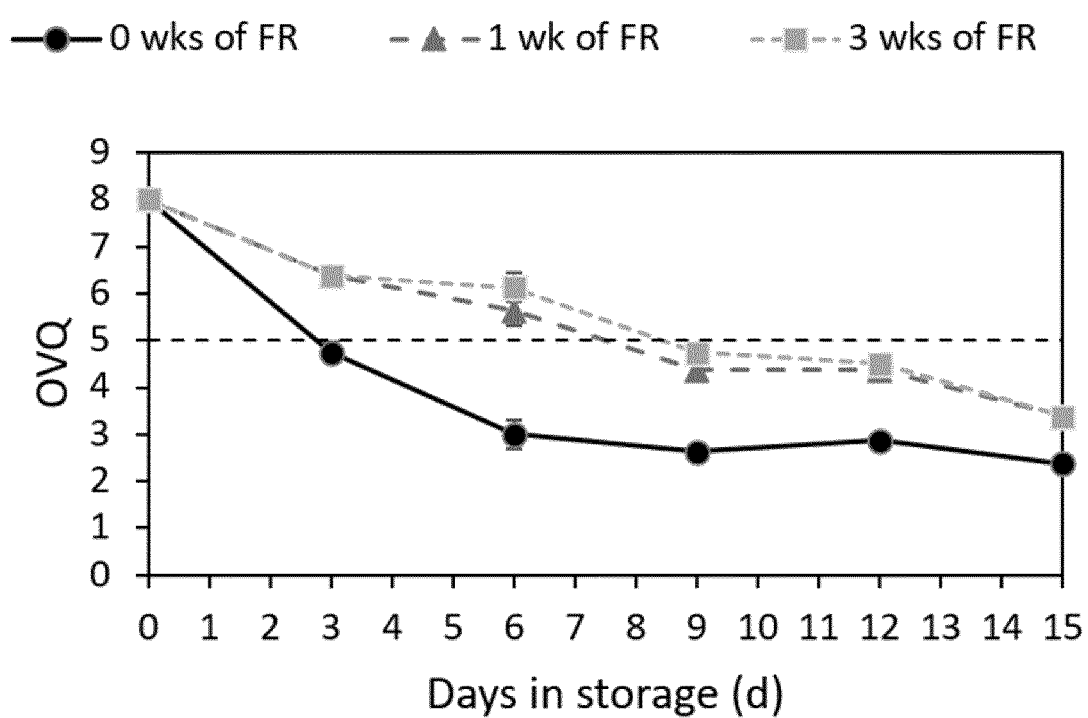
FIG. 6 shows test results on *Basilicum* cultivar Emily.

Effect of Pre-Harvest Application of Far Red on Chilling Resistance of *Basilicum* CV Emily Cultivar Emily, was grown in the same way as cultivar Lemon explained above. However, after the plants had been transplanted into their final grow environment they were exposed to horticulture light at an intensity of 150 μmol/m2/s and a deep red+white spectrum DRW having 11% blue, 18% green, 71% red, 1% far-red. The control horticulture light had a R:Fr ratio of 70 and was applied with a photoperiod of 16 h per day on-period. Next to the control group, who did not receive additional far-red during growth, there was also a second group receiving additional 180 μmol/m2/s of far-red light during the whole on-period during a period of 3 weeks before harvest and a third group receiving the additional 180 μmol/m2/s of Far-red light during the whole on-period only during a period of 1 week before harvest. The additional far-red (on top of the DRW) resulted in a R:Fr ratio of 0.65. The results in FIG. 6 show that there is a strong improvement of shelf life (due to chilling resistance) with 5 to 6 days. This also shows that a week of pre-harvest far-red treatment is almost as good as 3 weeks pre-harvest far-red treatment. This suggest that the chilling resistance is especially created in the last week before harvest. In such week the total amount of additional far-red applied is 70 moles. In comparison, the EOD far-red experiments discussed earlier used 28 moles.

It is therefore more advantageous to use the EOD far-red concept to increase chilling resistance than the 'whole day' far-red during the week before harvest to save energy, as far-red LEDs are not very efficient in terms of energy consumption. The duration of the end-of-day period is a trade-off between a minimum duration to achieve an increase in chilling resistance and a maximum duration taking into account energy consumption (which is relatively high for far-red LEDs) and elongation of the plant as a result of the far-red.

The invention claimed is:

1. A horticulture lighting arrangement, comprising a lighting system configured to provide horticulture light having a controllable spectral power distribution, and a control system configured to control the spectral power distribution of the horticulture light; wherein in an operational mode of the horticulture lighting arrangement the horticulture lighting arrangement is configured to provide the horticulture light according to an on-off schedule wherein consecutively an on-period and an off-period are applied, wherein:

the horticulture light comprises one or more of first horticulture light comprising a wavelength selected from the range of 400-600 nm, red light comprising a wavelength selected from the range of 600-700 nm, and far-red light comprising a wavelength selected from the range of 700-800 nm;

the on-period lasts in the range of 12-20 hours and the off-period lasts in the range of 4-12 hours, wherein the on-period comprises an end-of-day period at the end of the on-period, wherein the end-of-day period lasts in the range of 0.5-4 hours;

wherein during a substantial part of the on-period before the end-of-day period a R/Fr ratio, defined as a ratio of light intensity of the red light in terms of μmol/m$^2$/s of photons in the wavelength range selected from the range of 600-700 nm to light intensity of the far-red light in terms of μmol/m$^2$/s of photons in the wavelength range selected from the range of 700-800 nm, is selected from the range of 4-20, and during a substantial part of the end-of-day period the R/Fr ratio is selected from the range of 0.1-4, wherein the R/Fr ratio during said substantial part of the on-period is larger than the R/Fr ratio during said substantial part of the end-of-day period, wherein a contribution of the far-red light to the horticulture light during said substantial part of the end-of-day period is substantially higher than a contribution of the far-red light to the horticulture light during said substantial part of the on-period, wherein the horticulture lighting arrangement is configured to provide during the on-period the horticulture light with an average intensity selected from the range of 100-600 μmol/m$^2$/s, and wherein the horticulture light during the substantial part of the on-period before the end-of-day period comprises 5-20% of the photons in wavelength range of 400-500 nm, 0-30% of the photons in wavelength range of 500-600 nm, 50-95% of the photons in wavelength range of 600-700 nm, and 0-6% of the photons in wavelength range of 700-800 nm, and the horticulture light during the substantial part of the end-of-day period comprises 0-10% of the photons in wavelength range of 400-500 nm, 0-15% of the photons in wavelength range of 500-600 nm, 0-80% of the photons in wavelength range of 600-700 nm, and 20-100% of the photons in wavelength range of 700-800 nm.

2. The horticulture lighting arrangement according to claim 1, wherein the horticulture lighting arrangement is configured to provide during the on-period the horticulture light at a distance from the lighting system of at least 30 cm.

3. The horticulture lighting arrangement according to claim 1, wherein in the operational mode the contribution of far-red light to the horticulture light during the end-of-day period is controlled as function of one or more of a growth time of one or more plants, and a canopy density of one or more plants.

4. The horticulture lighting arrangement according to claim 1, wherein the lighting system comprises a first light generating device configured to generate at least part of the far-red light, wherein the first light generating device comprises a light emitting surface, and wherein in the operational mode the contribution of far-red light to the horticulture light during the end-of-day period is controlled as function of a first height of the light emitting surface above a substrate.

5. The horticulture lighting arrangement according to claim 1, comprising a first light generating device configured to generate first device light comprising far-red light, and a second light generating device configured to generate second device light comprising one or more of first horticulture light and red light, wherein during the on-period before the end-of-day period a contribution of the first device light to the horticulture light comprising one or more of the first device light and the second device light is less than 10%, and during at least the substantial part of the end-of-day period a contribution of the first device light to the horticulture light comprising one or more of the first device light and the second device light is at least 20%.

6. The horticulture lighting arrangement according to claim 1, wherein the on-period lasts in in the range of 14-19 hours and the off-period lasts in the range of 5-10 hours, wherein the end-of-day period lasts in the range of 1-3 hours.

7. A horticulture system, the horticulture system comprising an indoor facility and the horticulture lighting arrangement according to claim 1, wherein the horticulture lighting arrangement is configured to provide the horticulture light in the indoor facility.

8. The horticulture system according to claim 7, wherein the horticulture system comprises a plurality of first light generating devices.

9. A method of providing horticulture light to a Basil plant, the method comprising: providing during a controlling mode horticulture light to the Basil plant according to an on-off schedule wherein consecutively an on-period and an off-period are applied, wherein:
   the horticulture light comprises one or more of first horticulture light comprising a wavelength selected from the range of 400-600 nm, red light comprising a wavelength selected from the range of 600-700 nm, and far-red light comprising a wavelength selected from the range of 700-800 nm;
   the on-period lasts in in the range of 12-20 hours and the off-period lasts in the range of 4-12 hours, wherein the on-period comprises an end-of-day period at the end of the on-period; wherein the end-of-day period lasts in the range of 0.5-4 hours;
   wherein during a substantial part of the on-period before the end-of-day period a R/Fr ratio, defined as a ratio of light intensity of the red light in terms of $\mu mol/m^2/s$ of photons in the wavelength range selected from the range of 600-700 nm to light intensity of the far-red light in terms of $\mu mol/m^2/s$ of photons in the wavelength range selected from the range of 700-800 nm, is selected from the range of 4-20, and during a substantial part of the end-of-day period the R/Fr ratio is selected from the range of 0.1-4,
   wherein the R/Fr ratio during said substantial part of the on-period is larger than the R/Fr ratio during said substantial part of the end-of-day period,
   wherein a contribution of the far-red light to the horticulture light during said substantial part of the end-of-day period is substantially higher than a contribution of the far-red light to the horticulture light during said substantial part of the on-period,
   wherein, during the on-period, the horticulture light is provided to the Basil plant with an average intensity selected from the range of at least 50 $\mu mol/m^2/s$ at a distance from the lighting system of at least 30 cm, and
   wherein the horticulture light during the substantial part of the on-period before the end-of-day period comprises 5-20% of the photons in wavelength range of 400-500 nm, 0-30% of the photons in wavelength range of 500-600 nm, 50-95% of the photons in wavelength range of 600-700 nm, and 0-6% of the photons in wavelength range of 700-800 nm, and the horticulture light during the substantial part of the end-of-day period comprises 0-10% of the photons in wavelength range of 400-500 nm, 0-15% of the photons in wavelength range of 500-600 nm, 0-80% of the photons in wavelength range of 600-700 nm, and 20-100% of the photons in wavelength range of 700-800 nm.

10. The method according to claim 9, wherein during part of the end-of-day period first horticulture light, red light, and far-red light are provided.

11. The method according to claim 9, wherein the Basil plant is a Basil cultivar selected from the group consisting of Cinnamon, Dolly, Emily, and Lemon.

12. The method according to claim 9, comprising growing the Basil plant over a growing period t, wherein t is at least three weeks, and wherein the method further comprises applying during a first part of the growing period t during the entire on-periods of the first part of the growing period t horticulture light having a R/Fr ratio of at least 4, and applying during a second part of the growing period t during at least the substantial part of the end-of-day periods of the second part of the growing period t the horticulture light having the R/Fr ratio selected from the range of 0.1-4.

13. The method according to claim 9, further comprising controlling the contribution of far-red light to the horticulture light during the end-of-day period as function of a position where the far-red light is provided relative to a canopy of the Basil plant.

14. A method of providing horticulture light to a Basil plant, the method comprising
   growing the Basil plant over a growing period t, wherein t is at least three weeks; and
   providing during a controlling mode horticulture light to the Basil plant according to an on-off schedule wherein consecutively an on-period and an off-period are applied, wherein:
   the horticulture light comprises one or more of first horticulture light comprising a wavelength selected from the range of 400-600 nm, red light comprising a wavelength selected from the range of 600-700 nm, and far-red light comprising a wavelength selected from the range of 700-800 nm;
   the on-period lasts in in the range of 12-20 hours and the off-period lasts in the range of 4-12 hours, wherein the on-period comprises an end-of-day period at the end of the on-period; wherein the end-of-day period lasts in the range of 0.5-4 hours;
   wherein during a substantial part of the on-period before the end-of-day period a R/Fr ratio, defined as a ratio of light intensity of the red light in terms of $\mu mol/m^2/s$ of photons in the wavelength range selected from the range of 600-700 nm to light intensity of the far-red light in terms of $\mu mol/m^2/s$ of photons in the wavelength range selected from the range of 700-800 nm, is selected from the range of 4-20, and during a substantial part of the end-of-day period the R/Fr ratio is selected from the range of 0.1-4,
   wherein the R/Fr ratio during said substantial part of the on-period is larger than the R/Fr ratio during said substantial part of the end-of-day period,
   wherein a contribution of the far-red light to the horticulture light during said substantial part of the end-of-day period is substantially higher than a contribution of the far-red light to the horticulture light during said substantial part of the on-period, and
   wherein the method further comprises applying during a first part of the growing period t during the entire on-periods of the first part of the growing period t horticulture light having a R/Fr ratio of at least 4, and applying during a second part of the growing period t during at least the substantial part of the end-of-day periods of the second part of the growing period t the horticulture light having the R/Fr ratio selected from the range of 0.1-4.

* * * * *